United States Patent [19]

Roschger et al.

[11] Patent Number: 6,008,350
[45] Date of Patent: *Dec. 28, 1999

[54] PROCESS FOR THE PRODUCTION OF CYANINE DYES

[75] Inventors: Peter Roschger, Ludwigshafen; Stephan Michaelis, Odenthal; Karin Hassenrück, Düsseldorf; Horst Berneth, Leverkusen, all of Germany; Paul Callant, Edegem, Belgium

[73] Assignee: Agfa-Gevaert, Mortsel, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 08/612,870
[22] PCT Filed: Sep. 6, 1994
[86] PCT No.: PCT/EP94/02975
  § 371 Date: Mar. 13, 1996
  § 102(e) Date: Mar. 13, 1996
[87] PCT Pub. No.: WO95/07950
  PCT Pub. Date: Mar. 23, 1995

[30] Foreign Application Priority Data

Sep. 14, 1993 [DE] Germany .............................. 43 31 162

[51] Int. Cl.⁶ .......................... C09B 23/12; C09B 23/01; C07D 403/08
[52] U.S. Cl. .......................... 544/300; 544/301; 546/102; 548/455; 549/13; 549/428
[58] Field of Search ..................... 544/300, 301

[56] References Cited

U.S. PATENT DOCUMENTS 2,715,623  8/1955  Fry et al. ................................. 548/156

FOREIGN PATENT DOCUMENTS

| 0102781 | 3/1984 | European Pat. Off. . |
| 0335236 | 10/1989 | European Pat. Off. . |
| 1112495 | 3/1956 | France . |
| 3608214 | 9/1987 | Germany . |
| 0717858 | 11/1954 | United Kingdom . |
| 0728078 | 4/1955 | United Kingdom . |

*Primary Examiner*—Alan L. Rotman
*Attorney, Agent, or Firm*—Baker & Botts, L.L.P.

[57] ABSTRACT

The present invention relates to a process for the production of cyanine dyes with their methine chain showing group (M) and the charge compensation occuring by linked end groups through transformation of cationic cyanine dyes comprising group (D) with CH-acid compounds of the following formula (I) $B_1$—$CH_2$—$B_2$ in an inert solvent, the substituents having the significance given in the description.

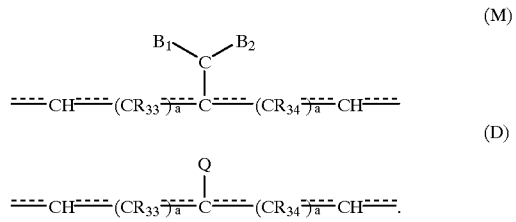

36 Claims, No Drawings

PROCESS FOR THE PRODUCTION OF CYANINE DYES

CROSS-REFERENCE

This application is a §371 of PCT/EP94/02975 filed Sep. 6, 1994.

FIELD OF THE INVENTION

The present invention relates to a process for the production of cyanine dyes with their methine chain showing the group (M)

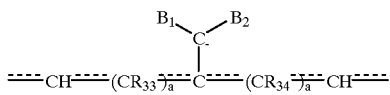
(M)

and the charge compensation occurring by linked end groups through transformation of cationic cyanine dyes comprising the following group (D)

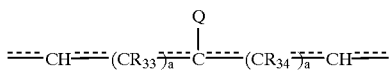
(D)

with CH-acid compounds of the formula I

in an inert solvent, preferably in the presence of a base and at a temperature ranging from 0 to 120° C., the substituents having the following significance:

$B_1$=cyano, alkoxycarbonyl, alkyl- and arylcarbonyl, aminocarbonyl possibly substituted once or twice by alkyl and/or aryl at the nitrogen atom, $B_2$=aryl- or alkylsulphonyl, heteroaryl, or

together the residue

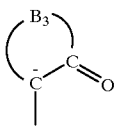

, wherein $B_3$ represents the non-metal atoms and possibly their substituents necessary to close a carbo- or heterocyclic 5- to 7-membered ring.

Q represents chlorine, fluorine, bromine, iodine, alkyl- or aryloxy, dialkyl-, diaryl- or alkylarylamino, nitro, cyano, alkyl- or arylsulphonyl, heterocyclyl or a residue of the formula L-S-, L represents alkyl, aryl, heterocyclyl, cyano or substituted carbonyl, thiocarbonyl or iminocarbonyl, α represents 0 or 1, $R_{33}$, $R_{34}$ represent, independently of each other, hydrogen, alkyl, aryl, alkoxycarbonyl or together represent the non-metal atoms necessary to close a substituted or unsubstituted carbo- or heterocyclic 5- to 7-membered ring.

Preferred heteroaryl residues $B_2$ have 5 or 6 ring members and 1 to 3 heteroatoms, such as O, S or N, especially substituted or unsubstituted 2-benzimidazolyl, 2-benzothiazolyl, 2-benzoxazolyl, 1,3,4-thiadiazol-2-yl, 1,2,4-triazol-3-yl, 2- or 4-pyridinyl or -quinolinyl.

In a preferred embodiment the group L is alkyl with 1 to 18 C-atoms, phenyl or naphthyl possibly substituted by chlorine, bromine, $C_1$–$C_{18}$-alkyl, $C_1$–$C_{18}$-alkoxy, carboxyl or $C_1$–$C_{18}$-alkoxycarbonyl, heterocyclyl with 5 or 6 ring members and 1 to 3 heteroatoms, such as O, S or N, especially substituted or unsubstituted benzimidazol-2-yl, benzothiazol-2-yl, 2-pyridinyl, 4-pyridinyl, 1,2,4-triazol-3-yl or a 1,3,4-thiadiazol-2-yl residue, cyano, $C_1$–$C_{18}$-alkylcarbonyl, a residue of the formula

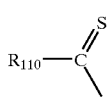

wherein
$R_{110}$ represents $C_1$–$C_{18}$-alkoxy or di-($C_1$–$C_{10}$-alkyl)-amino
a residue of the formula

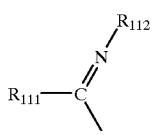

wherein
$R_{111}$ represents $C_1$–$C_{18}$-alkyl or aryl,
or a residue of the formula

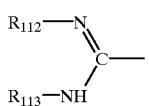

wherein
$R_{112}$, $R_{113}$ represent, independently of each other, H, $C_1$–$C_{10}$-alkyl, substituted or unsubstituted amino, aryl, or together represent the non-metal atoms necessary to close a 5- or 6-membered ring.

Heterocyclyl residues Q have preferably 5 to 7 ring members and 1 to 4 heteroatoms, the link to the methine chain of group D occurring over a C- or N-atom, especially residues of the 2-, 3- or 4-pyridinyl, 2-pyrazinyl, 3- or 4-pyridazinyl, 2-, 4- or 5-pyriminidyl, 2-, 3- or 4-pyranyl, 2-, 3- or 4-thiopyranyl, 2- or 3-pyrrolyl, 2- or 3-furanyl, thiophen-2- or -3-yl, 2-imidazolyl, 2-oxazolyl, 2-thiazolyl, 3-pyrazolyl, 3- or 5-isoxazolyl, 3- or 5-isothiazolyl, 1,3,4-thiadiazol-2-yl, 1,3,4-oxadiazol-2-yl or 1,2,4-triazol-3-yl series being linked to the methine chain over C-atoms, which residues of said heterocyclic series may carry fused-on rings, especially fused-on benzo-, naphtho- or cycloalkyl rings, and may further be substituted, especially by hydroxy, oxo, thioxo, ether, thioether, alkyl, aryl, cyano, nitro, carboxylic acid, ester or carbonamide groups or halogen, especially chlorine, bromine, fluorine. Further appropriate heterocyclic residues Q are pyrroles chain-linked over N-atoms, pyrazoles, imidazoles, triazoles, tetrazoles, pyrrolidines, morpholines, piperidines or piperazines each of which may be substituted by alkyl, aryl, heterocyclyl, acyl or alkoxycarbonyl residues, or imides or lactams chain-linked over N-atoms, especially N-phthalimidyl, N-succinimidyl, N-maleinimidyl, pyrrolidin-2-on-1-yl, caprolactam-1-yl.

In the process according to the present invention heterocyclyl residues Q for which the link to the methine chain occurs over an N-atom are preferred.

In the framework of the present invention the residues are preferably the following, unless stated explicitly otherwise: Alkyl residues include in addition to open-chain alkyl residues also cycloalkyl residues.

Open-chain alkyl residues contain 1 to 18 C-atoms and may also be branched, contain double or triple bonds and be interrupted once or several times by other atoms, especially oxygen, nitrogen or sulphur, e.g. to form poly(oxyalkylene) or poly(iminoalkylene) residues.

Cycloalkyl residues possess 3 to 18 ring members and may contain double bonds, be interrupted by atoms or groups, especially oxygen, nitrogen, sulphur or sulphonic groups and may possess fused-on cycloaliphatic, aromatic or heterocyclic rings.

Alkyl residues can be substituted by further residues, especially, independently of each other, by aryl, cycloalkyl, heterocyclyl, amino, ether, ester, ketone, aldehyde, hydroxy, nitro, cyano, sulphonic, sulphoxide or thioether groups, and by halogen, especially F, Cl, Br.

In a preferred embodiment it concerns dyes of the formula

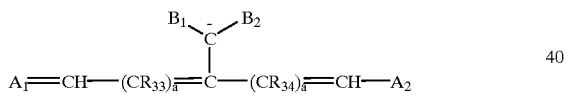

wherein the charge compensation occurs by the residues $A_1$ and wherein $B_1$, $B_2$, $R_{33}$, $R_{34}$ and α have the above-mentioned significance and $A_1$ corresponds to one of the following formulae IIa to VIIa and $A_2$ corresponds to one of the following formulae IIb to VIIb a)

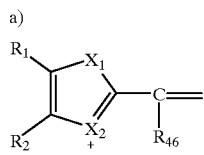

(IIa)

b)

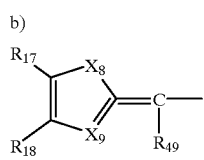

(IIb)

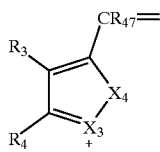

(IIIa)

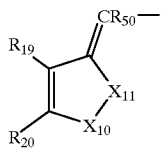

(IIIb)

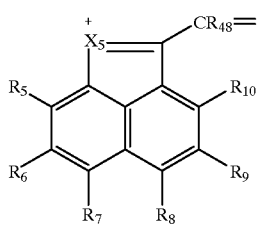

(IVa)

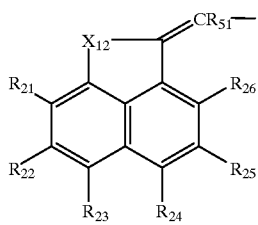

(IVb)

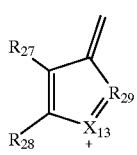

(Va)

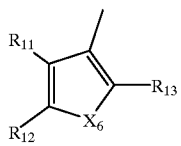

(Vb)

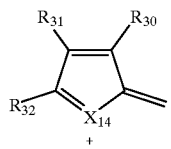

(VIa)

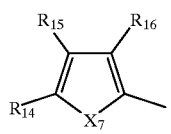

(VIb)

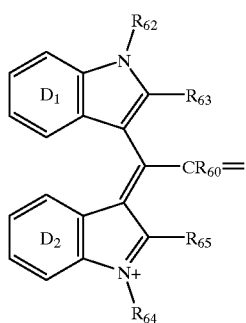
(VIIa)

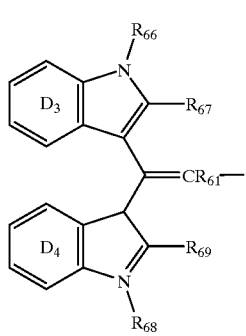
(VIIb)

wherein $X_1$, $X_8$, $X_4$, $X_{11}$ represent, independently of each other, $CR_{35}R_{36}$, O, S, $R_{37}N$, Se, Te, —$CR_{38}$=$CR_{39}$—, —N=$CR_{40}$—, —$Z_1$—$CR_{41}R_{42}$— or

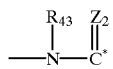

or only $X_4$, $X_{11}$ supplementarily to C* being linked to $X_3$ or $X_{10}$, $X_2$, $X_3$, $X_5$, $X_6$, $X_7$, $X_9$, $X_{10}$, $X_{12}$, $X_{13}$, $X_{14}$ represent O, S, Se, Te, $R_{44}N$, $R_1$ to $R_{32}$ represent, independently of each other, hydrogen, $C_1$–$C_8$-alkyl aryl, halogen, cyano, alkoxycarbonyl, substituted or unsubstituted aminocarbonyl, amino, mono- and dialkylamino, hydroxy, alkoxy, aryloxy, alkylthio, arylthio, acyloxy, acylamino, arylamino, alkylcarbonyl, arylcarbonyl or represent non-metal atoms to form cycloaliphatic aromatic or heterocyclic 5- to 7-membered rings to adjacent residues or atoms, $R_{37}$, $R_{43}$, $R_{44}$, $R_{45}$ represent substituted or unsubstituted alkyl or aryl or the atoms necessary to form 5- to 7-membered rings to adjacent residues or atoms, $R_{35}$, $R_{36}$, $R_{41}$, $R_{42}$ represent hydrogen, $C_1$–$C_6$-alkyl, or $R_{35}$ and $R_{36}$, $R_{41}$ and $R_{42}$ together represent the atoms necessary to form cycloaliphatic 5- to 7-membered rings, $R_{38}$, $R_{39}$ represent hydrogen, alkyl, aryl, or together represent the non-metal atoms necessary to form cycloaliphatic, aromatic and heterocyclic 5- to 7-membered rings, or they independently represent the non-metal atoms necessary to form 5- to 7-membered rings to adjacent atoms or residues, $R_{40}$ represents hydrogen, alkyl, aryl, $R_{46}$, $R_{47}$, $R_{49}$, $R_{50}$ represent hydrogen, alkyl, aryl, cyano, alkoxycarbonyl or the non-metal atoms necessary to form saturated or unsaturated 5- to 7-membered rings between $R_{46}$ and resp. $X_1$ and $X_2$, $R_{47}$ and resp. $X_4$ and $R_3$, $R_{49}$ and resp. $X_8$ and $X_9$, $R_{50}$ and resp. $X_{11}$ and $R_{19}$, $R_{48}$, $R_{51}$ represent hydrogen, alkyl, aryl, alkoxycarbonyl, $Z_1$, $Z_2$ represent O, S, $NR_{45}$, $R_{60}$, $R_{61}$ represent hydrogen, alkyl, aryl, cyano, alkoxycarbonyl, halogen, $R_{62}$, $R_{64}$, $R_{66}$, $R_{68}$ represent, independently of each other, alkyl, aryl, $R_{63}$, $R_{65}$, $R_{67}$, $R_{69}$ represent, independently of each other, hydrogen, alkyl, aryl, and the rings $D_1$, $D_2$, $D_3$, $D_4$, independently of each other, may be substituted once or several times by hydrogen, chlorine, bromine, alkyl, aryl, alkoxy.

In a preferred embodiment one of the following combinations of $A_1$ and $A_2$ is present:

IIa and IIb, IIa and IIIb, IVa and IVb, Va and Vb, VIa and VIb, as well as VIIa and VIIb.

Especially preferred is the variant wherein $A_1$ and $A_2$ have the same atomic skeleton.

Especially preferred is that process that is characterized in that $X_1$, $X_4$, $X_8$, $X_{11}$ represent, independently of each other, $CR_{35}R_{36}$, O, S, $R_{37}N$, —$CR_{38}$=$CR_{39}$—, $X_2$, $X_3$, $X_5$, $X_6$, $X_7$, $X_9$, $X_{10}$, $X_{12}$, $X_{13}$, $X_{14}$ represent, independently of each other, S, $R_{44}N$, O, $R_1$, $R_2$, $R_3$, $R_4$, $R_{17}$, $R_{18}$, $R_{19}$, $R_{20}$ represent, independently of each other, hydrogen, $C_1$–$C_6$-alkyl, phenyl, or $R_1$ and $R_2$, $R_3$ and $R_4$, $R_{17}$ and $R_{18}$, $R_{19}$ and $R_{20}$ represent, together and independently of other residue pairs, a cycloaliphatic 5- or 6-membered ring or a benzo-, naphtho- or phenanthreno ring that may be further substituted or not, $R_6$, $R_9$, $R_{10}$, $R_{22}$, $R_{25}$, $R_{26}$ represent hydrogen, $R_5$, $R_7$, $R_8$, $R_{21}$, $R_{23}$, $R_{24}$, independently of each other, represent hydrogen, alkyl, halogen (chlorine, bromine), $C_1$–$C_{18}$-alkyloxy, nitro, amino, dialkylamino, alkylamino, arylamino, $C_1$–$C_{18}$-alkyl- or arylthio, aryloxy, cyano, hydroxysulphonyl or $R_7$ and $R_8$, $R_{23}$ and $R_{24}$ together represent a residue of the formula (VIII)

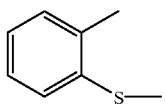
(VIII)

wherein the S-atom of VIII enters in p-position to $X_5$ or $X_{12}$ in the formulae IVa or IVb, $R_{11}$, $R_{12}$, $R_{13}$, $R_{27}$, $R_{28}$, $R_{29}$, independently of each other, represent hydrogen, $C_1$–$C_6$-alkyl, phenyl or $R_{11}$, and $R_{12}$, $R_{27}$ and $R_{28}$ together represent a cycloaliphatic 5- or 6-membered ring or a benzo- or naphtho ring that can be further substituted or not, $R_{14}$, $R_{32}$ represent substituted or unsubstituted dialkylamino, 4-morpholinyl, 1-piperidinyl, 1 pyrrolidinyl, $R_{15}$, $R_{16}$, $R_{30}$, $R_{31}$, independently of each other, represent hydrogen, $C_1$–$C_6$-alkyl, aryl, or $R_{15}$ and $R_{16}$ or $R_{14}$ resp. $R_{31}$ and $R_{30}$ or $R_{32}$ together represent a benzo- or naphtho ring, Each of $R_{35}$ and $R_{36}$ represents $C_1$–$C_4$-alkyl, or together represent a cycloaliphatic 5- or 6-membered ring, Each of $R_{38}$ and $R_{39}$ represents hydrogen, phenyl or together represent a benzo ring, $R_{37}$, $R_{44}$, $R_{62}$, $R_{64}$, $R_{66}$, $R_{68}$ represent $C_1$–$C_{18}$-alkyl that can be interrupted by oxygen groups, be substituted by phenyl, $C_1$–$C_4$-alkoxycarbonyl, cyano or chlorine, or contain 1 to 2 double bonds or one triple bond, $R_{47}$, $R_{50}$, $R_{46}$, $R_{49}$ represent hydrogen, $C_1$–$C_6$-alkyl, $C_1$–$C_4$-alkoxycarbonyl, phenyl, chlorine, bromine, $R_{48}$, $R_{51}$ represent hydrogen, $C_1$–$C_6$-alkyl, phenyl, $R_{60}$, $R_{61}$ represent hydrogen, $C_1$–$C_6$-alkyl, chlorine, bromine, phenyl, $R_{63}$, $R_{65}$, $R_{67}$, $R_{69}$ represent $C_1$–$C_6$-alkyl, phenyl, and the rings $D_1$, $D_2$, $D_3$, $D_4$, independently of each other, can be substituted by hydrogen, 1 to 2 chlorine atoms, or 1 to 2 methyl, ethyl, methoxy or ethoxy groups.

A further special embodiment is characterized in that $B_1$ and $B_2$ in

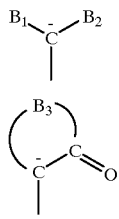

together represent the residue to complete the ring wherein $B_3$ represents the atoms necessary to complete a heterocyclic 5- or 6-membered ring of the pyridinone, pyrimidinone, pyrazolone, thiazolidinone, quinolinone, pyranone or coumarin series. Special preference is given to those processes wherein $B_3$ represents the necessary atoms to complete the following heterocyclic rings:

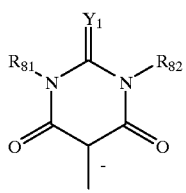 (IX)

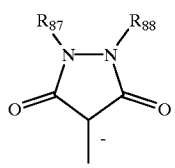 (X)

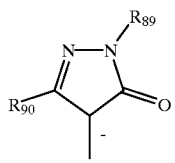 (XI)

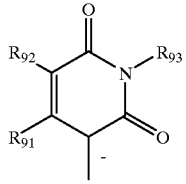 (XII)

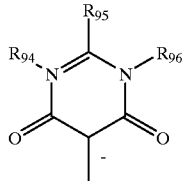 (XIII)

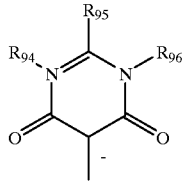 (XIV)

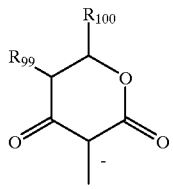 (XV)

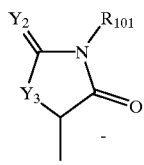 (XVI)

wherein $R_{81}$, $R_{82}$, $R_{87}$, $R_{88}$, $R_{89}$, $R_{93}$, $R_{96}$, $R_{101}$, independently of each other, represent $C_1$–$C_{18}$-alkyl that may be interrupted by oxygen groups, be substituted by phenyl, chlorine, COOH or alkoxycarbonyl, or contain 1 to 2 double bonds or one triple bond, or phenyl, $R_{90}$ represents $C_1$–$C_6$-alkyl, phenyl or $C_1$–$C_4$-alkoxycarbonyl, mono- or di-($C_1$–$C_{10}$)-alkylamino or mono- or di-($C_1$–$C_{10}$-alkyl)-aminocarbonyl, $R_{91}$, $R_{92}$, $R_{94}$, $R_{95}$, $R_{97}$, $R_{98}$, $R_{99}$, $R_{100}$, independently of each other, represent hydrogen, $C_1$–$C_6$-alkyl, phenyl or $R_{91}$ and $R_{92}$, $R_{94}$ and $R_{95}$, $R_{97}$ and $R_{98}$, $R_{99}$ and $R_{100}$ together represent —CH═CH—CH═CH— or tri- to pentamethylene chains wherein $R_{92}$, $R_{94}$, $R_{98}$, $R_{99}$ additionally represent $C_1$–$C_6$-acyl, benzoyl, cyano, $C_1$–$C_6$-alkoxycarbonyl, aminocarbonyl possibly mono- or di-substituted by alkyl, $Y_1$, $Y_2$, $Y_3$ represent O, S, N—$R_{80}$, $R_{80}$ meaning $C_1$- to $C_6$-alkyl or phenyl.

A very special preference is given to processes that are characterized in that $B_3$ completes a residue of the formula IX

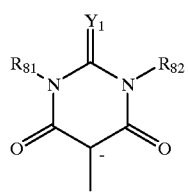

(IX)

wherein $Y_1$ represents O or S and $R_{81}$, $R_{82}$ have the same significance as given in formulae IX to XVI.

In an additional special embodiment of the process $R_{33}$ and $R_{34}$ together represent a di- or trimethylene residue. A special preference is given to processes wherein Q represents chlorine, bromine, dialkyl-, alkylaryl- or diarylamino, heterocyclyl linked over N-, or alkyl- or arylthio, especially to those processes wherein Q equals chlorine.

The said bases can be of the organic or inorganic type. Appropriate bases are e.g. alkylamines, dialkylamines, trialkylamines, pyridine, quinoline, carbonates, oxides, hydroxides, bicarbonates or acetates from alkaline metals or alkaline-earth metals. Especially appropriate are organic bases such as triethylamine, tripropylamine, tributylamine, dimethylaniline, diethylaniline, triethylenediamine (diaza[2.2.2]bicyclooctane), triethanolamine etc.

Halogen alkanes, alcohols, open-chain and cyclic ethers, aromates, ketones, acid amides, carboxylic acid esters, sulphones, sulphoxides are appropriate as solvents. These are, e.g., methylene chloride, chloroform, carbon tertrachloride, 1,1,1-trichloroethane, trichloroethylene, 1,2-dichloroethane, methanol, ethanol, propanols, butanols, pentanols, hexanols, benzyl alcohol, mono-, di-, tri- and tetraethylene glycol, phenylethanol, phenoxyethanol, propylene glycol, diethyl ether, dimethoxyethane, dimethoxydiethyl ether, methoxyethanol, diethylene glycol monoethyl ether, cyclohexanol, tetrahydrofuran, dioxan, benzene, toluene, xylene, chlorobenzene, 1,2-dichlorobenzene, bromobenzene, nitrobenzene, acetone, butanone, dimethylformamide, N-methylpyrrolidone, N,N'-dimethylimidazolidin-2-one, ethyl acetate, butyl acetate, benzyl acetate, sulpholan, dimethyl sulphoxide etc.

Especially interesting are methylene chloride, chloroform, carbon tetrachloride, 1,1,1-trichloroethane, trichloroethylene, 1,2-dichloroethane, $C_1$–$C_6$-alkanols, benzyl alcohol, mono-, di-, tri- and tetraethylene glycol, propylene glycol, phenylethanol, phenoxyethanol, methoxyethanol, ethoxyethanol, diethylene glycol monomethyl ether and diethylene glycol monoethyl ether, cyclohexanol, benzene, toluene, xylene, chlorobenzene, bromobenzene as well as mixtures hereof.

A very special preference is given to said chloroalkanes and alcohols as well as mixtures hereof.

Preferred transformation temperatures are in the range from 5 to 85° C., especially from 20 to 70° C.

The molar ratio of compounds with group D to compounds of formula I is in the range of 1:1 to 1:2, preferably from 1:1 to 1:1.3 mole. Suitably 1 to 2 mole of said bases, preferably 1.0 to 1.3 mole of base is added per mole of compound with group D. In case Q is fluorine, chlorine or bromine the quantity of the base is doubled.

The representation of compounds with group M has already been described partially in, e.g., GB-P 1 192 334, U.S. Pat. No. 2,955,939, EP 329 491 or EP 465 078. A disadvantage of said processes is that intermediates are used which are partly hard to prepare, i.e. there are reaction steps having low to average yields, thus lowering the overall yield. Furthermore lengthy isolation and purification steps are described which are no longer necessary with the new process.

A further advantage of the new process is the reduction of the overall step numbers with series tests when using different methylene-active compounds.

Reactions of CH-acid compounds with methine dyes have been described in GB-P 728 078, 717 858 and 747 083 as well as in Zhurnal Org. Khimii, vol. 14, no. 10, pages 2214–2221 (1978).

The partly known intermediates with the groups D wherein Q is halogen can be easily prepared, e.g., according to EP 483 740, EP 0 342 810, J. Org. Chem. 42, 885 (1977), DE 3 316 666 and DD 296 723 or in analogy herewith from the quaternary salts derived from $A_1$ and $A_2$ or from the corresponding free bases and halogenated bivalent aldehyde derivatives. Intermediates with the groups D wherein Q is not halogen can be produced from the corresponding halogen derivatives through substitution of the halogen by the corresponding nucleophile according to J. Org. Chem. 57, 4578 (1992), Synth. Commun. 22, 2593 (1992), Zh. Org. Khim. 15, 400–407 (1979) and others or in analogy herewith.

The invention further concerns new compounds of the formula

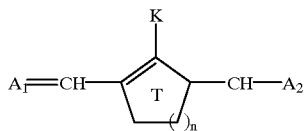

wherein

K represents Q with the counterion $An^{\ominus}$ or

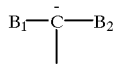

$An^{\ominus}$ represents a usually negative-charged counterion in the chemistry of cationic dyes or an equivalent of a corresponding ion, preferably chloride, bromide, iodide, fluoride, hydrogen difluoride, tosylate, benzene sulphonate, methyl sulphate, tetrafluoroborate, trifluoroacetate, trifluoromethyl sulphonate, methyl sulphonate, perfluorobutyl sulphonate, perchlorate, acetate, n represents 1 or 2, and $A_1$ and $A_2$ occur in the following combinations:
 1) Residues of the formulae (IIIa) and (IIIb) wherein
    $X_3$, $X_{10}$=O and
    $X_4$, $X_{11}$=—$CR_{38}$=$CR_{39}$—, $R_{38}$ and $R_{39}$ having the above-mentioned significances,
    except for those compounds wherein Q equals Cl and at the same time n equals 1,
 2) or residues of the formulae (IIIa) and (IIIb) wherein
    $X_3$, $X_{10}$=$R_{44}$N,
    X, $X_{11}$=—$CR_{38}$=$CR_{39}$— and
    $R_3$ and $R_4$, $R_{38}$ and $R_{39}$ together complete a substituted or unsubstituted aromatic ring, preferably a benzene ring, or
 3) residues of the formulae (IVa) and (IVb), except for those compounds of the combination wherein $X_5$, $X_{12}$=$R_{44}$N and at the same time Q=halogen, or
 4) residues of the formulae (VIIa) and (VIIb),
 and the ring T can be substituted by 1 to 3 $C_1$–$C_4$-alkyl residues (preferably $CH_3$).

The index n gives the number of methylene groups in the indicated position: when n=1 the ring T is a 5-membered ring, when n=2 it is a 6-membered ring.

New compounds which are especially preferred are mentioned separately hereafter:

Dyes with naphtholactam groups are partly known, e.g. from DE 3 738 911 or DE 3 608 214. The intermediates and dyes with group D and M cited here are partly new. Hence intermediates and dyes of the formula (XX) are a further object of the present invention

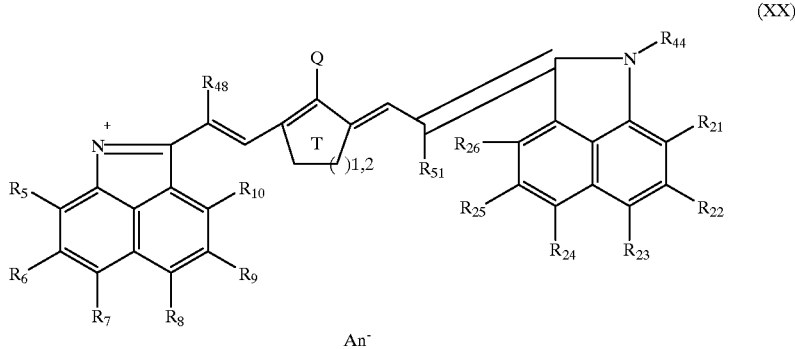

(XX)

wherein

Q represents H, alkyl, aryl, alkyl- or aryloxy, dialkyl-, diaryl- or alkylarylamino, nitro, cyano, alkyl- or arylsulphonyl, heterocyclyl or a residue of the formula L-S- and $R_5$–$R_{10}$, $R_{21}$–$R_{26}$, $R_{48}$, $R_{51}$, $R_{44}An^{\ominus}$ and L have the same significance as described above, wherein the ring T preferably carries no further substituents but may also be substituted by 1 to 3 $C_1$–$C_4$-alkyl groups which are independent of each other.

In a preferred embodiment of these intermediates and dyes of the formula XX

Q represents hydrogen, $C_1$–$C_6$-alkyl, phenyl, $C_1$–$C_{18}$-alkyloxy, aryloxy, di-$C_1$–$C_{18}$-alkyl, substituted or unsubstituted diphenylamino or $C_1$–$C_{18}$-alkyl-(substituted or unsubstituted)phenylamino, heterocyclyl or a residue of the formula LS- wherein said open-chain, branched or cyclic alkyl residues may be substituted by hydroxy, alkoxycarbonyl, acyloxy or phenyl, contain a double bond and be interrupted by one or several oxygen groups.

A special preference is given to those dyes of the formula XX wherein

Q represents hydrogen, phenyl, dialkyl-, diphenyl- or alkylphenylamino, heterocyclyl or a residue of the formula LS wherein L equals $C_1$–$C_{12}$-alkyl- or represents phenyl possibly substituted by chlorine, $C_1$–$C_{18}$-alkyl, $C_1$–$C_{12}$-alkyloxy or $C_1$–$C_{12}$-alkyloxycarbonyl, the alkyl residues being able to assume the above-mentioned significances.

Another object of the present invention are dyes of the formula (XXI)

(XXI)

wherein $B_1$, $B_2$, $R_5$–$R_{10}$, $R_{21}$–$R_{26}$, $R_{44}$, $R_{51}$, $R_{48}$, T have the above-mentioned significance.

Preferred intermediates and dyes of the formulae (XX) and (XXI) are also those wherein $R_5=R_{21}$ $R_6=R_{22}$ $R_7=R_{23}$ $R_8=R_{24}$ $R_9=R_{25}$ $R_{10}=R_{26}$ $R_{48}=R_{51}$ Cationic tetraindolyl heptamethine dyes have already been described in DE 3 841 184, but not the corresponding nonamethine dyes nor the neutral (betainic) types. Also object of the present invention are hence intermediates and dyes of the formula (XXII)

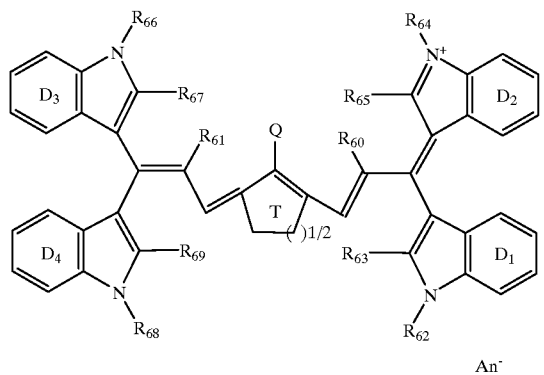

(XXII)

An⁻ wherein $R_{60}$ to $R_{69}$, $D_1$ to $D_4$, Q, $An^\ominus$, T having the above-mentioned significance can be present. As far as Q is halogen, bromine and especially chlorine are preferred.

A further object of the present invention are dyes of the formula (XXIII),

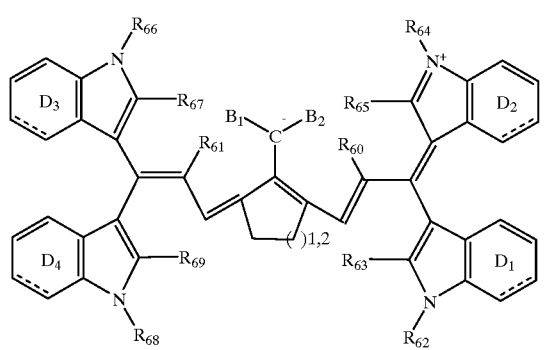

(XXIII)

wherein $R_{60}$ to $R_{69}$, $D_1$ to $D_4$, $B_1$, $B_2$, T have the above-mentioned significances.

Preferred embodiments of the compounds of the formulae (XXII) and (XXIII) are those wherein $R_{60}=R_{61}R_{62}=R_{66}$ $R_{64}=R_{68}$ $R_{63}=R_{67}$ $R_{65}=R_{69}$ and the benzene rings $D_1$ and $D_3$ have the same substitution pattern and $D_2$ and $D_4$ have the same substitution pattern.

A very special preference is given to dyes of the formulae (XXII) and (XXIII) wherein $R_{60}=R_{61}$ $R_{62}=R_{64}=R_{66}=R_{68}$ $R_{63}=R_{65}=R_{67}=R_{69}$ and the benzene rings $D_1$, $D_2$, $D_3$ and $D_4$ have the same substitution pattern.

Cationic 4-pyranylidene dyes have been described, e.g., in Zh. Org. Khim. 27, pages 1367–1373 (1991) (English translation) or DE 3 316 666. The ones described in the present invention are, however, partly new.

As an object of the present invention can also be mentioned hence the intermediates and dyes of the formula (XXIV)

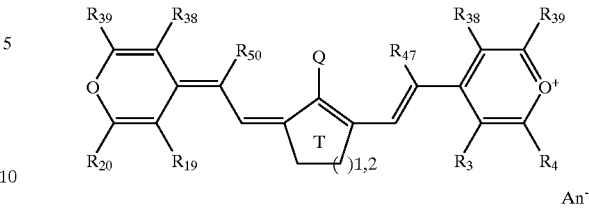

(XXIV)

An⁻ wherein $R_3$, $R_4$, $R_{19}$, $R_{20}$, $R_{38}$, $R_{39}$, $R_{47}$, $R_{50}$, $An^\ominus$, Q and T have the above-mentioned significance, except for the compounds wherein Q equals Cl and the index equals 1.

A further object of the present invention are dyes of the formula (XXV)

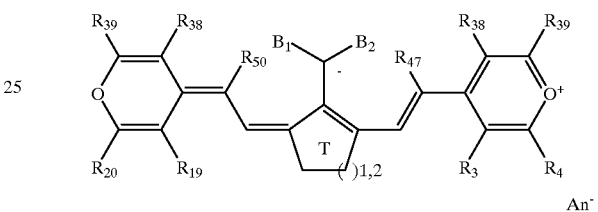

(XXV)

An⁻ wherein $R_3$, $R_4$, $R_{19}$, $R_{20}$, $R_{38}$, $R_{39}$, $R_{47}$, $R_{50}$, $B_1$, $B_2$, T have the above-mentioned significances.

A preferred embodiment of the intermediates and dyes of the formulae (XXIV) and (XXV) is the one wherein $R_4$, $R_{20}$, $R_{39}$ represent phenyl and $R_3$, $R_{19}$, $R_{38}$ represent hydrogen, $C_1$–$C_4$-alkyl.

Also preferred is that embodiment of intermediates and dyes of the formulae (XXIV) and (XXV) wherein $R_{47}=R_{50}$ $R_3=R_{38}=R_{19}$ $R_4=R_{20}=R_{39}$.

Dyes containing acridine groups are known from, e.g., Chimia 45, 304–307 (1991), but not the ones described in the present invention.

An object of the present invention are therefore also intermediates and dyes of the formula (XXVI)

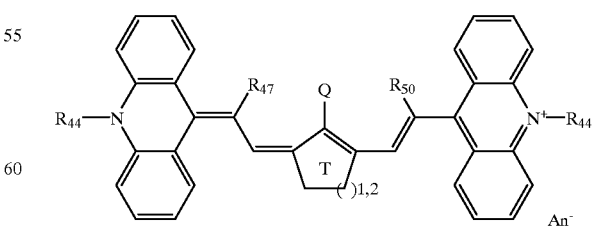

(XXVI)

An⁻ wherein $R_{44}$, $R_{47}$, $R_{50}$, $An^\ominus$, Q and T have the above-mentioned significances, as well as dyes of the formula (XXVII)

(XXVII)

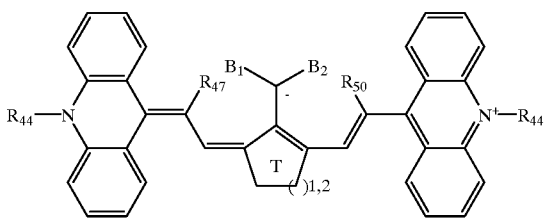

wherein $R_{44}$, $R_{47}$, $R_{50}$, $B_1$, $B_2$, T have the above-mentioned significances.

A special preference is given to intermediates and dyes of the formulae (XXVI) and (XXVII) wherein $R_{47}$ and $R_{50}$ are identical and represent hydrogen or $C_1$–$C_{16}$-alkyl.

2-thiopyrylium dyes have been described, e.g., in U.S. Pat. No. 4,948,777; EP 251 117; Khim. Geterosikl. Soedin. 1981, 887–893 (English translation); Springer Series Opt. Sci. 40, 424–426 (1983); Ukrain. Khim. Zh. 51, 102–103 (1985) (English translation); J. Org. Chem. 42, 885–888 (1977).

A further object of the present invention are intermediates and dyes of the formula (XXVIII)

(XXVIII)

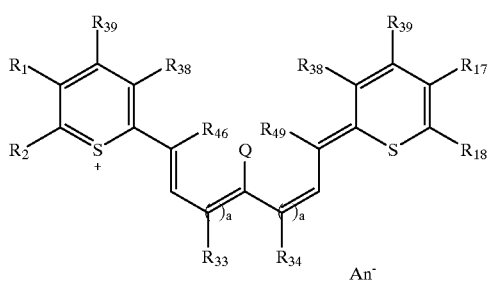

wherein $R_1$, $R_2$, $R_{17}$, $R_{18}$, $R_{33}$, $R_{34}$, $R_{38}$, $R_{39}$, $R_{46}$, $R_{49}$, $An^\ominus$, Q and α have the above-mentioned significances, except for the compound described in J. Org. Chem. 42, 885–888 (1977) and Res. Discl. 155, 71–74 (1977) according to the formula

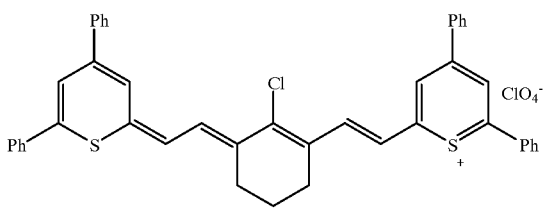

wherein Ph=phenyl.

Also an object of the present invention are dyes of the formula (XXIX)

(XXIX)

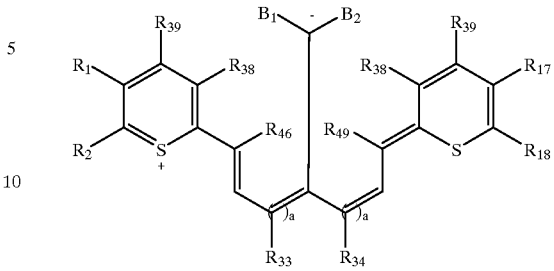

wherein $R_1$, $R_2$, $R_{17}$, $R_{18}$, $R_{33}$, $R_{34}$, $R_{38}$, $R_{39}$, $R_{46}$, $R_{49}$, $B_1$, $B_2$, α have the above-mentioned significance. Preference is given to intermediates and dyes of the formulae (XXVIII) and (XXIX) wherein $R_1=R_{17}$ $R_2=R_{18}$ $R_{46}=R_{49}$ and if α is identical to 1, $R_{32}$ and $R_{34}$ represent a di- or trimethylene residue.

Special preference is given to intermediates and dyes of the formulae (XXVIII) and (XXIX) wherein $R_1$, $R_{17}$ represent hydrogen, $C_1$–$C_4$-alkyl, benzoyl, $C_1$–$C_4$-alkoxycarbonyl, $R_2$, $R_{18}$, $R_{39}$ represent phenyl, $R_{38}$ represents hydrogen, $C_1$–$C_4$-alkyl, phenyl, $C_1$–$C_4$-alkoxycarbonyl, $R_{46}$, $R_{49}$ represent hydrogen, $C_1$–$C_4$-alkyl, phenyl or $R_{38}$ and $R_{46}$, $R_{49}$ and $R_{38}$ together represent a di- or trimethylene residue.

A very special preference is given to those embodiments of intermediates and dyes of the formulae (XXVIII) and (XXIX) wherein $R_{39}$, $R_2$, $R_{18}$ represent phenyl, $R_1$, $R_{17}$ represent hydrogen and $R_{38}$ and $R_{46}$, $R_{38}$ and $R_{49}$ together represent a di- or trimethylene residue. A further preferred embodiment of the dye of formula (XXIX) is the one wherein α is identical to 1 and $R_{33}$ and $R_{34}$ together form a di- or trimethylene residue.

The dyes according to the present invention are suited for use in heat-mode recording materials for the production of imagewise heat recordings by means of imagewise exposure of the recording material to infrared light. Corresponding infrared sources can be e.g. infrared lasers, especially NdYAG lasers.

The dyes according to the present invention can be present in a separate heat-mode recording layer or in the layer in which the image is produced. The dyes according to the present invention are preferably dissolved or dispersed in a polymeric binder. In a preferred embodiment the recording material contains on a support a heat-mode recording layer with one or several infrared-absorbing dyes and an image-forming layer. Such image-forming layers can be for example coloured polymer layers or layers presenting lithographic properties after exposure, so that they can be used as printing plates. A typical example of an image-forming layer that can result in a printing plate after exposure is for example a silicone layer.

After the imagewise exposure to infrared light the heat-mode recording material can be developed by rubbing off the heat-mode material, thus removing the image-forming layer in the exposed areas. In another embodiment the image-forming layer can be removed in the exposed or unexposed areas with the help of a plastic film or paper, possibly under the influence of heat.

The heat-mode recording material can contain additional heat-mode recording layers apart from the recording layer containing the dyes according to the present invention. In a preferred embodiment a heat-mode recording layer containing an infrared dye according to the present invention can be combined with a metal layer releasing heat upon imagewise exposure, e.g. to infrared light. Such metal layers consist, e.g., of aluminium, bismuth or silver.

The dyes according to the present invention can be used furtheron in such heat-mode recording elements containing a dye precursor and a colour developer, producing by means of imagewise exposure an imagewise heat pattern that causes an imagewise reaction of the dye precursor with the colour developer, which results in a colour image. The dyes according to the invention can be present in the layer incorporating the dye precursor and/or in a layer incorporating the colour developer. Dye precursor, colour developer and dye according to the invention can also be present in the same layer. Typical dye precursors are leuco dyes that get coloured after reaction with an organic acid.

The dyes according to the present invention are furtheron very suited for heat-mode recording materials containing an organic silver salt and a reducing agent. Such heat-mode recording materials can for example have a support preferably made of paper or polyester, an organic silver salt, a reducing agent and a dye according to the present invention. After imagewise exposure to an infrared source, e.g. a laser, a silver image is formed in the exposed area on the basis of the reduction of the organic silver salt by the heat released during exposure by the dye according to the invention.

The dyes according to the present invention can further be used in colour-giving elements containing a dye that diffuses during heating thereby producing during infrared exposure an imagewise transfer of the dye from the colour-giving element to a receiving element.

The dyes according to the present invention are furthermore suited for ablation-transfer recording systems. Such recording materials contain a support, a top layer that can be removed upon exposure and contains dyes according to the invention, and preferably an image-forming material, for example a dye or a pigment. The top layer can be removed through radiation with infrared light. Consequently the surface of the image-receiving material can be modified imagewise in such a way that it accepts or rejects ink. That way a lithographic printing plate can be produced. In another embodiment in which the top layer contains an image-forming material (e.g. a dye or a pigment) an image can be formed on the receiving material.

The dyes according to the invention are also suited as antihalation dyes in common silver-halide recording materials. The following examples illustrate the invention without, however, limiting it.

The abbreviations mentioned in the examples mean:

| Tosyl | 4-methylphenylsulphonyl |
| Ac | acetyl |
| Me | methyl |
| Et | ethyl |
| Pr | propyl |
| Bu | butyl |
| Ph | phenyl |

| DABCO | 1,4-diazabicyclo [2,2,2] octane (triethylenediamine) |

A) Preparation of the Intermediates and Dyes with D-groups wherein Q represents Halogen Example A1

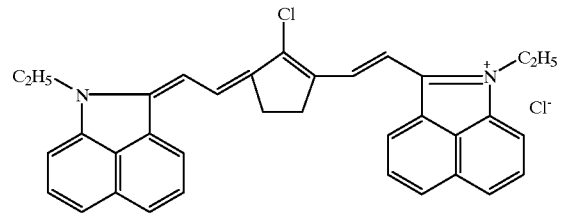

Method 1

A mixture of 69.5 g of benzindolium salt corresponding to the following formula:

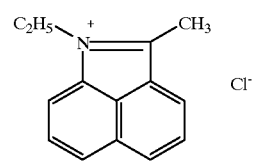

23.6 g of an aldehyde corresponding to the following formula:

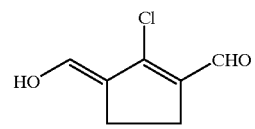

and 1,000 ml of methanol was refluxed for 2 h. Subsequently the reaction solution was concentrated by evaporation and the residue was mixed with a small amount of acetone. The precipitation was sucked off, washed with acetone and dried in vacuo at 50° C.

Yield: 45.3 g.

$\lambda_{max}$=1,051 nm (CH$_2$Cl$_2$).

The aldehyde necessary for this method

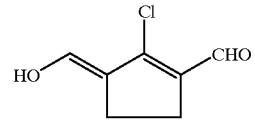

was prepared as follows:

A solution of 400 ml of dimethylformamide and 400 ml of methylene chloride was mixed for 45 min with a solution of 375 ml of phosphorus oxytrichloride in 350 ml of methylene chloride at 4 to 5° C. Subsequently the mixture was stirred at 5° C. for another 30 min and then 84 g of cyclopentanone was added dropwise for approx. 15 min causing the temperature to reach boiling heat. After refluxing for 5 h methylene chloride was distilled off to 45° C. (internal temperature) and subsequently the methylene chloride was removed in vacuo. The residue was discharged on 3 kg of ice. The mixture was stirred for another 2 h and was subsequently mixed slowly at room temperature with approx. 1.25 l of concentrated caustic soda up to pH 5. The mixture was stirred overnight and the resulting precipitate was subsequently sucked off and washed with water. After drying in vacuo at room temperature 132 g (84%) of the aldehyde of the above-mentioned formula was obtained.

Method 2

A mixture of 1.15 g of the above-mentioned benzindolium salt, 0.395 g of an aldehyde corresponding to the following formula:

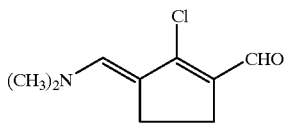

and 25 ml of methanol was refluxed for 30 min. Subsequently the reaction mixture was mixed with acetone and cyclohexane and the product was then sucked off. After drying in vacuo at 50° C. 0.7 g of the dye corresponding to the above-mentioned formula was obtained.

The aldehyde used in this method

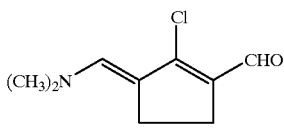

was prepared in the following way:

A mixture of 80 ml of dimethylformamide and 80 ml of methylene chloride was mixed at 4 to 5° C. for 30 min with a solution of 74 ml of phosphorus oxytrichloride in 70 ml of methylene chloride and was subsequently stirred at 5° C. for 30 min. Then 16.8 g of cyclopentanone was added dropwise to this mixture in 15 min. The mixture was then refluxed for 5 h. Subsequently it was discharged on 400 ml of ice under additional external cooling and another 200 g of ice was added after 30 min. It was stirred for 1.5 h and brought to pH 5 with approx. 300 ml of concentrated caustic soda at room temperature. The precipitate was sucked off after a short time, washed with water and dried in vacuo at room temperature.

Yield: 17.8 g.

Example A2

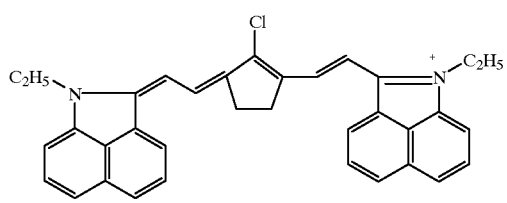

A mixture of 2.31 g of the benzindolium salt from example A1 and 0.86 g of an aldehyde corresponding to the following formula:

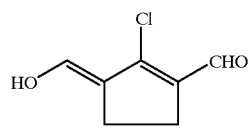

was stirred in 30 ml of methanol in the presence of 0.5 ml of concentrated hydrochloric acid at 60° C. for 1 h. Subsequently the solvent was removed on the Rotavapor, the residue was mixed with 25 ml of methylene chloride, heated to the boiling point and the precipitate was finally sucked off. After washing with methylene chloride and drying in vacuo at 50° C. 1.7 g of the compound of the above-mentioned structure was obtained.

$\lambda_{max}$=1,024 nm ($CH_2Cl_2$).

Example A4

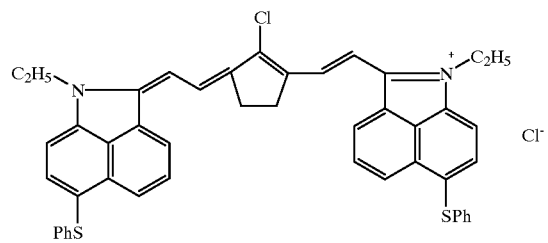

40.3 g of the benzindolium salt corresponding to the following formula:

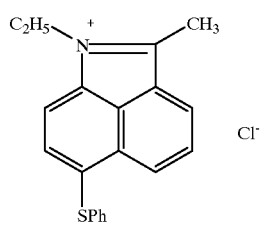

and 11.0 g of the aldehyde used in example A1, method 1 were refluxed in 800 ml of methanol for 1 h. The deposited product was filtered off, washed with methanol and dried.

Yield: 28.8 g.

$\lambda_{max}$=1,095 nm.

Example A5

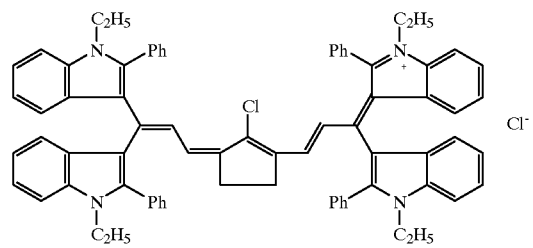

A solution of 3.5 g of the bisindolylethylene corresponding to the following formula:

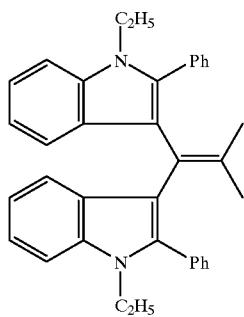

0.6 g of the aldehyde from example A1, method 2, and 0.35 ml of concentrated hydrochloric acid in a mixture of 30 ml of methylene chloride and 2 ml of methanol was refluxed for 4 h and subsequently stirred overnight. Afterwards a part of the solvent was removed on the Rotavapor and the product was sucked off.

Yield: 2.7 g.

$\lambda_{max}$=1,042 nm (CH$_2$Cl$_2$).

Example A6

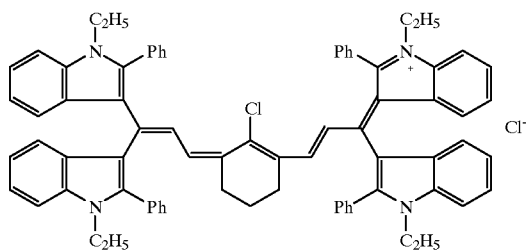

A mixture of 2.33 g of the bisindolylethylene from example A5, 0.431 g of the aldehyde from example A2, 70 ml of methanol and 0.25 ml of concentrated hydrochloric acid was refluxed for 2 h. After cooling down the precipitate (impurity) was sucked off and the filtrate was concentrated by evaporation on the Rotavapor. After drying 2.64 g of the dye of the above-mentioned formula was obtained.

$\lambda_{max}$=1,012 nm (CH$_2$Cl$_2$).

Example A7

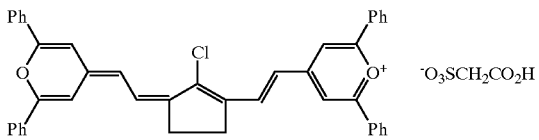

A mixture of 1.73 g of the pyrylium salt corresponding to the following formula:

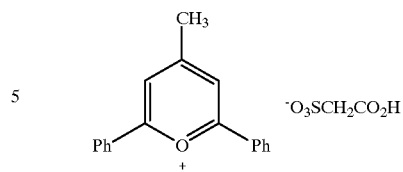

0.4 g of the aldehyde from example A1, 30 ml of methanol and 0.2 ml of concentrated hydrochloric acid was refluxed for 4 h. Subsequently the mixture was cooled down, the precipitate was sucked off, washed with methanol and dried at 50° C.

Yield: 0.9 g.

$\alpha_{max}$=970 nm, 1,105 nm (CH$_2$Cl$_2$).

Example A8

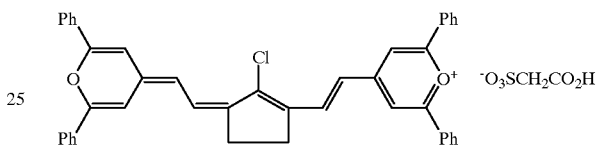

1.79 g of the pyrylium salt from example A7, 0.51 g of the aldehyde from example A2, 30 ml of methanol and 0.25 ml of concentrated hydrochloric acid were refluxed for 5 h. After cooling down the precipitate was sucked off, washed with methanol and dried in vacuo at 50° C.

Yield: 0.5 g.

$\lambda_{max}$=953 nm, 1,074 nm (CH$_2$Cl$_2$).

Example A9

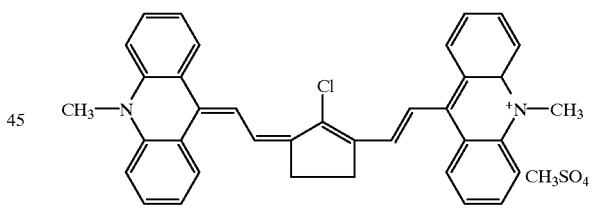

A mixture of 1.9 g of an acridinium salt according to the following formula:

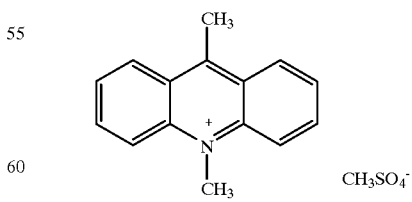

and 0.48 g of the aldehyde from example A1 was refluxed in 100 ml of n-butanol for 10 h. After cooling down the precipitate was sucked off and washed with methanol.

Yield: 0.4 g.

Example A10

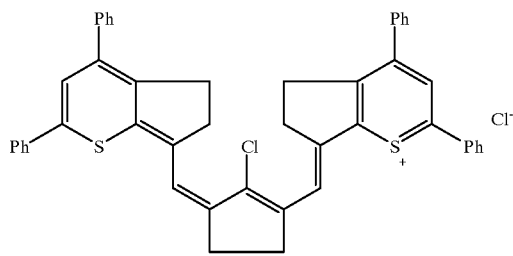

A mixture of 1.8 g of the thiopyrylium salt corresponding to the following formula:

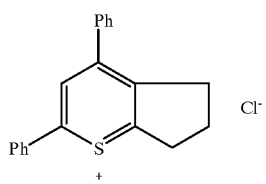

0.4 g of the aldehyde from example 1, method 2, 0.1 ml of concentrated hydrochloric acid, 5 ml of methylene chloride and 35 ml of methanol was stirred at room temperature for 2 days. Afterwards the solvent was removed in vacuo and the residue was mixed with 50 ml of acetone. The resulting suspension was refluxed for 2 h; subsequently the precipitate was sucked off while warm, washed with acetone and dried.

Yield: 1.0 g $\lambda_{max}$=1,120 nm, 1,288 nm (CH$_2$Cl$_2$).

Example A11

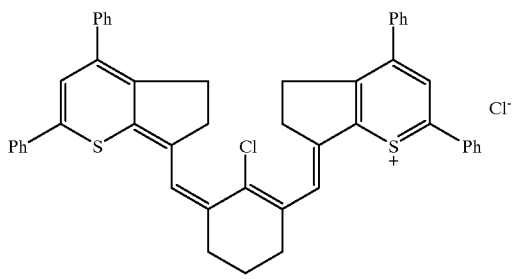

3.24 g of the thiopyrylium salt from example A10, 0.86 g of the aldehyde from example A2, 30 ml of methanol and 0.5 ml of concentrated hydrochloric salt were stirred at 55° C. for 1 h. Subsequently the precipitate was sucked off at room temperature, washed with methanol and dried in vacuo at 50° C.

Yield: 2.5 g.

$\lambda_{max}$=1,105 nm, 1,255 nm (CH$_2$Cl$_2$).

Example A12

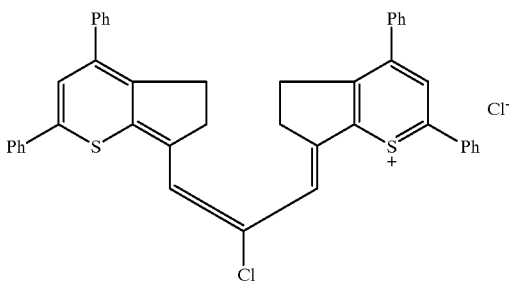

0.81 g of the thiopyrylium salt from example A10, 0.366 g of a chlormalondialdehyde derivate corresponding to the following formula:

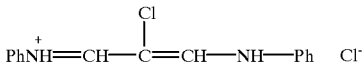

and 25 ml of methanol were stirred at 55 to 60° C. for 45 min. The resulting precipitate was then sucked off at room temperature and washed with methanol.

Yield: 0.5 g.

$\lambda_{max}$=1,100 nm (CH$_2$Cl$_2$).

Example A13

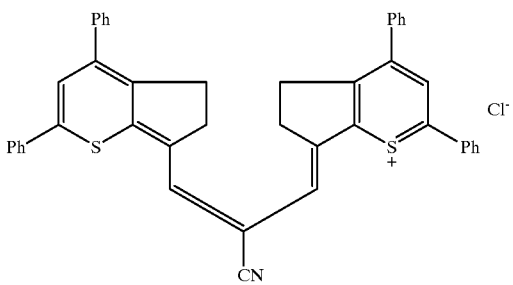

A mixture of 1.62 g of the thiopyrylium salt from example A10, 0.31 g of an aldehyde corresponding to the following formula:

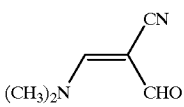

and 60 ml of methanol was refluxed for 75 min. After cooling down the precipitate was sucked off, washed with methanol and dried.

Yield: 0.8 g.

$\lambda_{max}$=1,023 nm (CH$_2$Cl$_2$).

Example A14

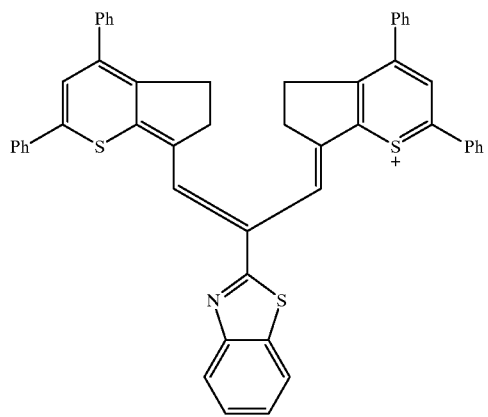

A mixture of 1.63 g of the thiopyrylium salt from example A10, 0.53 g of an aldehyde corresponding to the following formula:

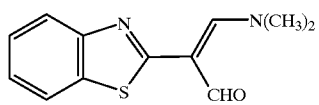

and 25 ml of methanol was stirred at 60° C. for 1 h and subsequently mixed with cyclohexane. The solution was decanted from the resinous residue which was taken up in methylene chloride, whereupon the solvent was removed entirely on the Rotavapor. The solid residue was dried in vacuo at 50° C.

Yield: 1.3 g.

$\lambda_{max}$=1,047 nm (CH$_2$Cl$_2$).

The 2-(benzothiazol-2-yl)-3-dimethylaminopropenal used in this example was obtained by Vilsmeyer formylation of 2-methylbenzothiazole according to DE 2 135 156 (described therein as 2-(benzothiazol-2-yl)-malondialdehyde).

Example A15

A mixture of 3.25 g of the thiopyrylium salt from example A10, 0.5 ml of concentrated hydrochloric salt, 1.12 g of an aldehyde corresponding to the following formula:

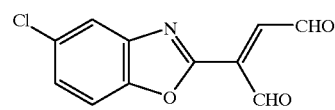

and 40 ml of methanol was stirred at 55 to 60° C. for 2 h; after 15 min a thick suspension was formed that was made ready for stirring by adding another 10 ml of methanol. The precipitate was sucked off, washed with methanol and dried in vacuo at 50° C.

Yield: 2.7 g.

$\lambda_{max}$=1,032 nm (CH$_2$Cl$_2$).

The following dyes were obtained according to the preparation methods of examples A1 up to A15 by using the corresponding intermediates:

TABLE 1

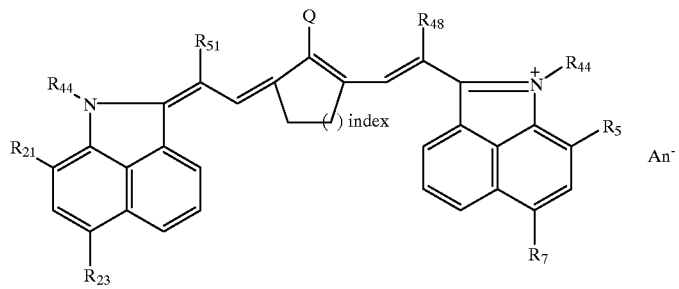

| R$_5$ | R$_7$ | R$_{21}$ | R$_{23}$ | R$_{44}$ | R$_{48}$ | R$_{51}$ | Q | Index | An |
|---|---|---|---|---|---|---|---|---|---|
| H | H | H | H | Me | H | H | Cl | 1 | Cl |
| H | H | H | H | Me | H | H | Cl | 2 | MeSO$_4$ |
| H | H | H | H | Me | H | h | Br | 1 | Cl |
| H | H | H | H | Me | H | H | Br | 2 | Cl |
| H | Phs | H | Phs | Et | H | H | Cl | 1 | Cl |
| H | PhS | H | PhS | Et | H | H | Cl | 2 | Tos—O |
| PhS | PhS | PhS | PhS | Et | H | H | Cl | 1 | Cl |

TABLE 1-continued

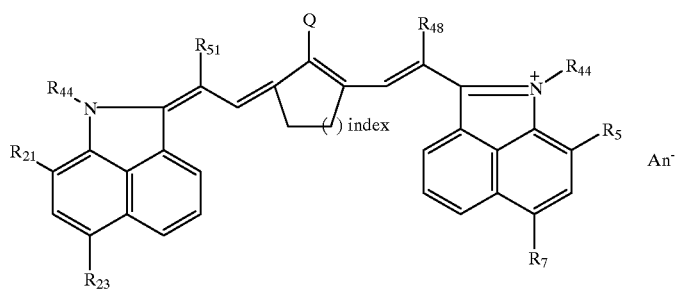

| R$_5$ | R$_7$ | R$_{21}$ | R$_{23}$ | R$_{44}$ | R$_{48}$ | R$_{51}$ | Q | Index | An |
|---|---|---|---|---|---|---|---|---|---|
| H | Br | H | Br | Et | H | H | Cl | 1 | Cl |
| H | Cl | H | Cl | n-Pr | H | H | Cl | 2 | Cl |
| H | F1 | H | F1 | Et | H | H | Cl | 1 | Cl |
| H | CH$_3$—(CH$_2$)$_3$—S— | H | CH$_3$—(CH$_2$)$_3$—S— | n-Bu | H | H | Cl | 1 | 1 |
| H | HO—CH$_2$—CH$^2$—S— | H | HO—CH$_2$CH$_2$—S— | Et | H | H | Cl | 1 | Cl |
| H | F2 | H | F2 | 1-Octyl | H | H | Cl | 1 | ClO$_4$ |
| H | F3 | H | F3 | 1-Dodecyl | H | H | Cl | 1 | Cl |
| H | F4 | H | F4 | 1-Octadecyl | H | H | Cl | 1 | Cl |
| H | Et$_2$N— | H | Et$_2$N— | 1-Hexyl | H | H | Cl | 2 | Cl |
| H | F5 | H | F5 | 1-Pentyl | H | H | Cl | 1 | Cl |
| H | PhO— | H | PhO— | Et | H | H | Cl | 1 | Cl |
| H | EtO— | H | EtO— | Et | H | H | Cl | 1 | Cl |
| H | PhNH | H | PhNH | 1-Decyl | H | H | Cl | 1 | Cl |
| H | n-Bu—NH | H | n-Bu—NH | 1-Hexyl | H | H | Cl | 1 | Cl |
| H | HOCH$_2$CH$_2$NH— | H | HOCH$_2$CH$_2$NH— | 1-Octyl | H | H | Cl | 1 | Cl |
| H | H(OCH$_2$CH$_2$)$_2$O | H | H(OCH$_2$CH$_2$)$_2$O— | Et | H | H | Cl | 1 | Cl |
| H | PhS— | H | PhS— | HOCH$_2$CH$_2$— | H | H | Cl | 1 | Cl |
| H | PhS— | H | PhS— | F6 | H | H | Cl | 1 | Cl |
| H | F4 | H | F4 | F7 | H | H | Cl | 1 | Cl |
| H | Ph—S— | H | PhS— | NC—CH$_2$CH$_2$— | H | H | Cl | 1 | Cl |
| H | HO$_2$CCH$_2$S— | H | HO$_2$CCH$_2$S— | Et | H | H | Cl | 1 | Cl |
| H | Ph—S | H | PhS— | EtO$_2$CCH$_2$— | H | H | Cl | 1 | Cl |
| H | Ph—S | H | PhS— | PhCH$_2$ | H | h | Cl | 1 | Cl |
| H | (HOCH$_2$CH$_2$)$_2$N— | H | (HOCH$_2$CH$_2$)$_2$— | EtO$_2$CH$_2$CH$_2$— | H | H | Cl1 | 1 | ClO$_4$ |
| H | H | H | H | Et | Me | Me | Cl | 1 | 1 |
| H | H | H | H | Me | Et | Et | Cl | 2 | 1 |
| H | Ph—S— | H | Ph—S— | Et | 1-Pentyl | 1-Pentyl | Cl | 1 | Br |
| H | H | H | H | ET | 1-Undecyl | 1-Undecyl | Cl | 1 | Br |
| H | Ph—S | H | PhS— | PhCH$_2$ | H | h | Cl | 1 | Cl |
| H | F1 | H | F1 | 1-Tetradecyl | Ph | Ph | Cl | 2 | Br |
| H | NC— | H | NC— | Et | Me | Me | Br | 1 | 1 |
| H | H$_2$N | H | H$_2$N | Et | H | H | Cl | 2 | Cl |
| H | O$_2$N | H | O$_2$N | Et | H | H | Br | 2 | Cl |
| H | HO$_3$S | H | HOP$_3$S | Et | H | H | Cl | 1 | Cl |

F1

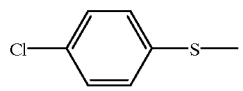

F2

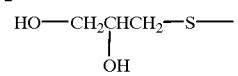

F3

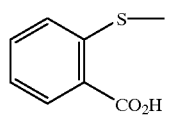

F4

TABLE 1-continued

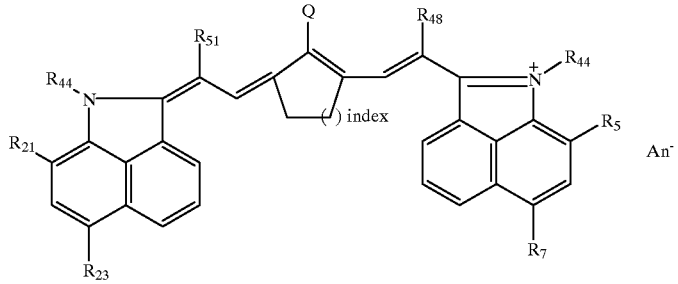

| $R_5$ | $R_7$ | $R_{21}$ | $R_{23}$ | $R_{44}$ | $R_{48}$ | $R_{51}$ | Q | Index | An |
|---|---|---|---|---|---|---|---|---|---|

F5

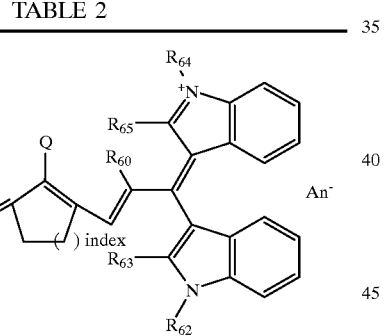

F6 n-octyl-CHCH$_2$
         |
         OH

F7

CH$_3$—CHCH$_2$
         |
         OH

TABLE 2

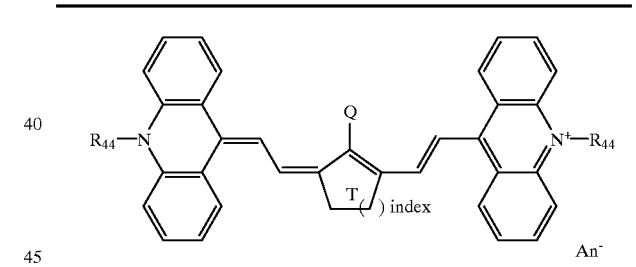

| $R_{62}, R_{64}, R_{66}, R_{68}$ | $R_{63}, R_{65}, R_{67}, R_{69}$ | $R_{60}, R_{61}$ | Q | Index | An |
|---|---|---|---|---|---|
| Me | Ph | H | Cl | 1 | Cl |
| Me | Me | H | Cl | 2 | Cl |
| n-Bu | Ph | H | Cl | 1 | Cl |
| 1-Hexyl | Ph | H | Cl | 1 | Cl |
| 1-Dodecyl | Ph | H | Cl | 1 | Cl |
| 1-Octadecyl | Ph | H | Cl | 1 | Cl |
| HOCH$_2$CH$_2$— | Ph | H | Cl | 1 | Cl |
| F6 | Ph | H | Cl | 1 | Cl |
| HO—CH$_2$CH$_2$OCH$_2$CH$_2$— | Ph | H | Cl | 2 | Cl |
| NCCH$_2$CH$_2$— | Me | H | Br | 2 | Br |
| ETO$_2$CCH$_2$CH$_2$— | Et | H | Br | 1 | ClO$_4$ |
| HO$_2$CCH$_2$ | 1-Butyl | H | Cl | 1 | Cl |
| PhCH$_2$ | Ph | H | Cl | 1 | HSO$_4$ |
| Et | Ph | Me | Cl | 1 | Cl |
| Et | Ph | Cl | Cl | 1 | Cl |
| Et | Ph | Ph | Cl | 1 | Cl |
| Me | Ph | CN | Br | 2 | ClO$_4$ |
| Et | Ph | 1-Butyl | Cl | 1 | Cl |

TABLE 3

| $R_{44}$ | Q | Index | An |
|---|---|---|---|
| Et | Cl | 1 | MeSO$_4$ |
| Et | Cl | 2 | Cl |
| 1-Butyl | Br | 1 | Br |
| 1-Hexyl | Cl | 1 | Br |
| 1-Decyl | Cl | 1 | Br |
| HOCH$_2$CH$_2$— | Cl | 1 | TosO |
| H(OCH$_2$CH$_2$)$_2$— | Cl | 1 | TosO |
| F6 | Cl | 1 | TosO |
| PhCH$_2$ | Br | 2 | Cl |
| NCCH$_2$CH$_2$ | Cl | 1 | Cl |
| EtO$_2$CCH$_2$ | Cl | 1 | Br |

TABLE 4

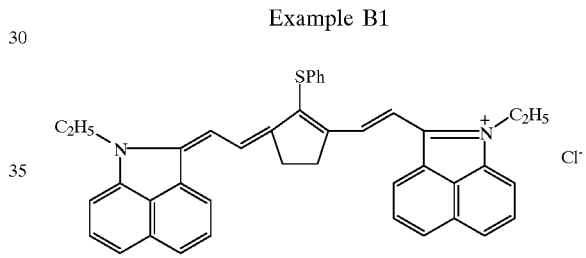

| $R_3, R_{19}, R_{38}$ | $R_{47}, R_{50}$ | Q  | Index | An |
|---|---|---|---|---|
| H  | H  | Br | 1 | $O_3SCH_2CO_2H$ |
| H  | H  | Br | 2 | $O_3SCH_2CO_2H$ |
| H  | Me | Cl | 1 | $ClO_4$ |
| H  | Et | Cl | 1 | $ClO_4$ |
| Me | H  | Cl | 1 | $O_3SCH_2CO_2H$ |
| Et | Me | Br | 1 | Cl |

TABLE 5

| $R_{38}$ | $R_{46}, R_{49}$ | Q | Index | An |
|---|---|---|---|---|
| H | H | Cl | 2 | Cl |
| $EtO_2C$ | H | Cl | 1 | Cl |
| Ph | H | Cl | 1 | Cl |
| Me | Me | Br | 1 | $ClO_4$ |
| $EtO_2C$ | $EtO_2C$ | Br | 2 | $ClO_4$ |
| —$(CH_2)_2$— | | Br | 1 | Cl |
| —$(CH_2)_2$— | | Br | 2 | Cl |
| —$(CH_2)_3$ | | Cl | 1 | Cl |
| —$(CH_2)_3$ | | Cl | 2 | Cl |
| F8 | | Cl | 1 | Cl |
| F9 | | Cl | 2 | $C_4F_9SO_3$ |

F8

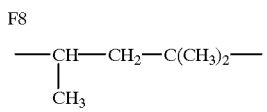

F9

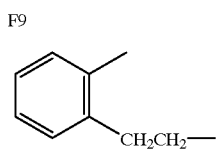

TABLE 6

| $R_{38}$ | $R_{46}, R_{49}$ | Q | An |
|---|---|---|---|
| H | H | Cl | Cl |
| $ETO_2C$ | H | Br | Cl |
| PH | H | Cl | Cl |
| Me | Me | Cl | $ClO_4$ |
| $EtO_2C$ | $EtO_2C$ | BR | I |
| —$(CH_2)_3$— | | Cl | Cl |
| —$(CH_2)_3$— | | Br | Cl |
| —CHMe—$CH_2CMe_2$— | | Cl | $ClO_4$ |
| —$(CH_2)_2$— | | $NO_2$ | Cl |

B) Preparation of the Intermediates and Dyes with D-groups wherein Q is different from Halogen by the Process of Nucleophilic Halogen Substitution Example B1

Method 1

A mixture of 1.55 g of the dye from example A1, 0.34 g of thiophenol, 3 ml of methanol and 30 ml a methylene chloride was stirred at room temperature for 7 h. During this period 0.1 ml of thiophenol was added after 2 h, 0.4 ml of trialkylamine was added after 3 h and once again after 4 h, and ml of methanol was added over the entire reaction time. Subsequently the mixture was diluted with methanol, sucked off from the precipitate (impurity) and the solvent of the filtrate was removed on the Rotavapor. The residue was mixed with acetone/cyclohexane (2:1), stirred for 1 h, sucked off and washed with acetone/cyclohexane (2:1). After drying in vacuo at 40° C. 1.2 g was obtained.

$\lambda_{max}$=1,065 nm ($CH_2Cl_2$).

Method 2

A suspension of 1.64 g of the dye from example A1 in a solution of 0.40 g of thiophenol and 0.56 g (0.8 ml) of triethylamine in ethanol/methylene chloride (70:2 ml) was stirred at room temperature for 1.5 h. Subsequently the ecipitate was sucked off and washed with acetone/cyclohexane 2:1.

Yield: 1.0 g. Another 0.4 g can be obtained when the mother-lye is diluted with 150 ml of cyclohexane and the precipitate is sucked off.

Example B2

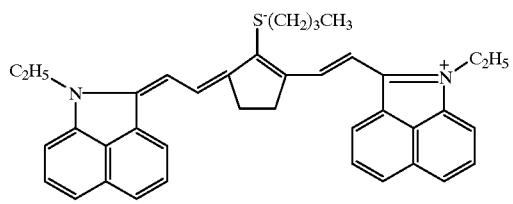

A mixture of 1.6 g of the dye from example A1, 0.3 g of 1-butylmercaptan, 70 ml of ethanol, 2 ml of methylene chloride and 1.6 ml of triethylamine was stirred at root temperature for 4 h. Subsequently the precipitation was filtered and the solvent was entirely removed in vacuo. The residue was mixed with 100 ml of cyclohexane/acetone mixture (8:2 vol.), sucked off and then stirred overnight in 20 ml of acetone. The precipitate was sucked off again, washed with cyclohexane/acetone (1:1 vol.) and dried in vacuo at 40° C.

Yield: 1.0 g.

$\lambda_{max}$=1,068 nm (CH$_2$Cl$_2$).

Example B3

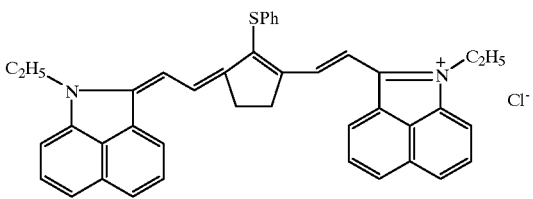

A mixture of 0.56 g of the product from example A2, 0.12 g of thiophenol, 0.12 g of triethylamine and ml of dimethylformamide was stirred for 10 min. Subsequently the solution was mixed with cyclohexane as a result of which the product deposited as an oil.

The oil was mixed with methylene chloride and this solution was washed with water. Then the methylene chloride was removed in vacuo and the precipitate was dried in vacuo at 50° C.

Yield: 0.6 g.

$\lambda_{max}$=1,045 nm (CH$_2$Cl$_2$).

When the mercaptans used in the examples B1 to B3 are replaced by nucleophiles of the formula QH and when instead of the intermediates used therein other products of the A-examples are transformed in analogy with example B1 to B3 and in analogy with the literature cited in the description, the following compounds are obtained:

TABLE 7

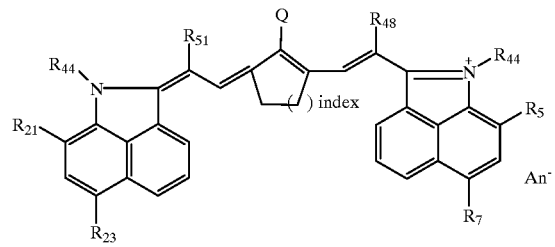

| R$_5$ | R$_7$ | R$_{21}$ | R$_{23}$ | R$_{44}$ | R$_{48}$ | R$_{51}$ | Q | Index | An |
|---|---|---|---|---|---|---|---|---|---|
| H | H | H | H | Me | H | H | PhS | 1 | Cl |
| H | H | H | H | Me | H | H | 1-Bus | 2 | MeSO$_4$ |
| H | H | H | H | Me | H | H | Ph$_2$N— | 1 | Cl |
| H | H | H | H | Me | H | H | F5 | 2 | Cl |
| H | PhS | H | PhS | Et | H | H | MeO | 1 | Cl |
| H | PhS | H | PhS | Et | H | H | PhO | 2 | Tos—O |
| PhS | PhS | PhS | PhS | Et | H | H | PhNH | 1 | Cl |
| H | Br | H | Br | Et | H | H | F1 | 1 | Cl |
| H | Cl | H | Cl | n-Pr | H | H | F4 | 2 | Cl |
| H | F1 | H | F1 | Et | H | H | (HOCH$_2$CH$_2$)$_2$N— | 1 | Cl |
| H | CH$_3$—(CH$_2$)$_3$—S— | H | CH$_3$—(CH$_2$)$_3$—S— | n-Bu | H | H | 1-Bu—O | 1 | I |
| H | HOCH$_2$CH$_2$—S— | H | HO—CH$_2$CH$_2$—S— | Et | H | H | F10 | 1 | Cl |
| H | F2 | H | F2 | 1-Octyl | H | H | F11 | 1 | ClO$_4$ |
| H | F3 | H | F3 | 1-Dodecyl | H | H | HO$_2$CCH$_2$S— | 1 | Cl |
| H | F4 | H | F4 | 1-Octadecyl | H | H | ET$_2$N— | 1 | Cl |
| H | Et$_2$N— | H | Et$_2$N— | 1-Hexyl | H | H | Et$_2$N— | 2 | Cl |
| H | F5 | H | F5 | n-Pentyl | H | H | F12 | 1 | Cl |
| H | PhO— | H | PhO— | Et | H | H | HOCH$_2$CH$_2$S— | 1 | Cl |
| H | EtO— | H | EtO— | Et | H | H | PhS | 1 | Cl |
| H | PhNH | H | PhNH | 1-Decyl | H | H | PhS— | 1 | Cl |
| H | n-Bu—NH | H | n-Bu—NH | 1-Hexyl | H | H | PhS— | 1 | Cl |
| H | HOCH$_2$CH$_2$NH— | H | HOCH$_2$CH$_2$NH— | 1-Octyl | H | H | 1-Bu—S— | 1 | Cl |
| H | H(OCH$_2$CH$_2$)$_2$O— | H | H(OCH$_2$CH$_2$)$_2$O— | Et | H | H | F3 | 1 | C |
| H | PhS— | H | PhS— | HOCH$_2$CH$_2$ | H | H | F2 | 1 | Cl |
| H | PhS— | H | PhS— | F6 | H | H | HOCH$_2$CH$_2$—O— | 1 | Cl |
| H | F4 | H | F4 | F7 | H | H | H(OCH$_2$CH$_2$)$_2$O— | 1 | Cl |
| H | Ph—S— | H | PhS— | NC—CH$_2$CH$_2$ | H | H | H(OCH$_2$CH$_2$)$_4$O— | 1 | Cl |
| H | HO$_2$CCH$_2$S— | H | HO$_2$CCH$_2$S— | Et | H | H | PhS | 1 | Cl |
| H | Ph—S— | H | PhS— | EtO$_2$CCH$_2$— | H | H | MeO | 1 | Cl |
| H | Ph—S— | H | PhS— | PhCH$_2$ | H | H | MeO | 1 | Cl |

TABLE 7-continued
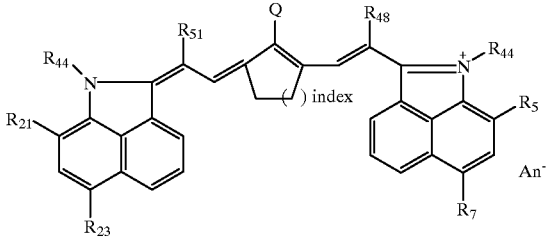
| R$_5$ | R$_7$ | R$_{21}$ | R$_{23}$ | R$_{44}$ | R$_{48}$ | R$_{51}$ | Q | Index | An |
|---|---|---|---|---|---|---|---|---|---|
| H | (HOCH$_2$CH$_2$)$_2$N— | H | (HOCH$_2$CH$_2$)$_2$N— | EtO2CCH$_2$CH$_2$— | H | H | 1-Decyl-NH | 1 | ClO$_4$ |
| H | H | H | H | Et | Me | Me | F13 | 1 | I |
| H | H | H | H | Me | Et | Et | F14 | 2 | I |
| H | Ph—S— | H | Ph—S— | Et | 1-Pentyl | 1-Pentyl | MeO | 1 | Br |
| H | H | H | H | Et | 1-Undecyl | 1-Undecyl | PhO | 1 | Br |
|  | F1 | H | F1 | 1-Tetra-decyl | Ph | Ph | F15 | 2 | Br |
|  |  | H | NC | Et | Me | Me | F16 | 1 | 1 |
| H | H$_2$N | H | H$_2$N | Et | H | H | PhS | 2 | Cl |
| H | O$_2$N | H | O$_2$N | Et | H | H | F17 | 2 | Cl |
| H | HO$_3$S | H | HO$_3$S | Et | H | H | F18 | 1 | Cl |
F10
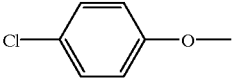
F11
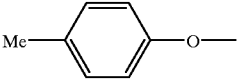
F12
F13
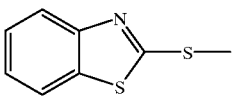
F14
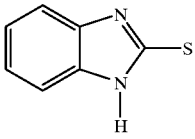
F15
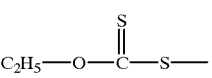
F16

TABLE 7-continued

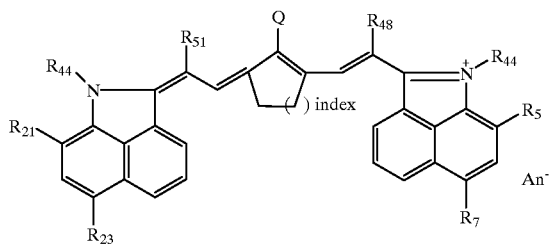

| R$_5$ | R$_7$ | R$_{21}$ | R$_{23}$ | R$_{44}$ | R$_{48}$ | R$_{51}$ | Q | Index | An |
|---|---|---|---|---|---|---|---|---|---|

F17

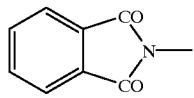

F18

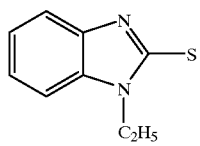

TABLE 8

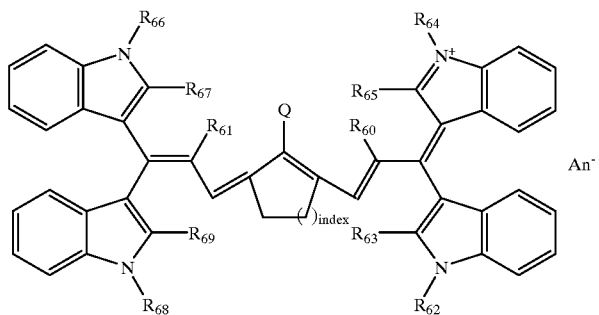

| R$_{62}$, R$_{64}$, R$_{66}$, R$_{68}$ | R$_{63}$, R$_{65}$, R$_{67}$, R$_{69}$ | R$_{60}$, R$_{61}$ | Q | Index | An |
|---|---|---|---|---|---|
| Me | Ph | H | PhS | 1 | Cl |
| Me | Me | H | 1-Bu—S— | 2 | Cl |
| n-Bu | Ph | H | F1 | 1 | Cl |
| 1-Hexyl | Ph | H | F4 | 1 | Cl |
| 1-Dodecyl | Ph | H | PhS— | 1 | Cl |
| 1-Octadecyl | Ph | H | Et$_2$N | 1 | Cl |
| HOCH$_2$CH$_2$— | Ph | H | PhoI | 1 | Cl |
| F6 | Ph | H | MeO | 1 | Cl |
| HO—CH$_2$CH$_2$OCH$_2$CH$_2$— | Ph | H | F5 | 2 | Cl |
| NCCH$_2$CH$_2$— | Me | H | F13 | 2 | Br |
| EtO$_2$CCH$_2$CH$_2$— | Et | H | F14 | 1 | ClO$_4$ |
| HO$_2$CCH$_2$— | 1-Butyl | H | F3 | 1 | Cl |
| PhCH$_2$ | Ph | H | HOCH$_2$CH$_2$S— | 1 | HSO$_4$ |
| Et | Ph | Me | PhS | 1 | Cl |
| Et | Ph | Cl | PhS | 1 | Cl |
| Et | Ph | Ph | PhS | 1 | Cl |
| Me | Ph | CN | PhS | 2 | ClO$_4$ |
| Et | Ph | 1-Butyl | PhS | 1 | Cl |

TABLE 9

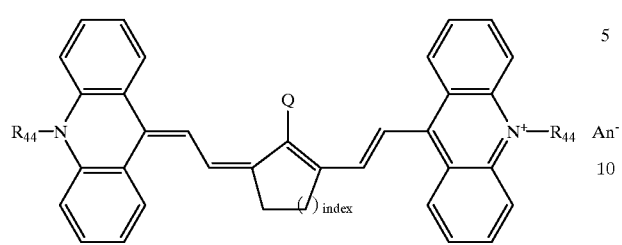

| R44 | Index | Q | An |
|---|---|---|---|
| Et | 1 | PhS | MeSO4 |
| Et | 2 | F1 | Cl |
| 1-Butyl | 1 | F4 | Br |
| 1-Hexyl | 1 | F19 | Br |
| 1-Decyl | 1 | F2 | Br |
| HOCH2CH2— | 1 | 1-Bu—S— | Tos—O |
| H(OCH2CH2)2— | 1 | HO2C—CH2—S—S | Tos—O |
| F6 | 1 | F5 | Tos—O |
| PhCH2 | 2 | F13 | Cl |
| NCCH2CH2 | 1 | EtO2CCH2—O— | Br |
| ETO2CCH2 | 1 | EtO2CCH2—O— | Br |

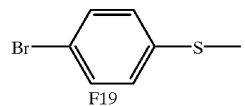

TABLE 10

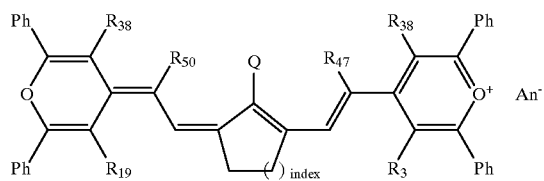

| R3, R19, R38 | R47, R50 | Q | Index | An |
|---|---|---|---|---|
| H | H | PhS— | 1 | O3SCH2CO2H |
| H | H | 1-BU—S— | 2 | O3SCH2CO2H |
| H | Me | PhNH— | 1 | ClO4 |
| H | Et | PhO— | 1 | ClO4 |
| Me | H | MeO— | 1 | O3SCH2CO2H |
| ET | Me | Et2N— | 1 | Cl |

TABLE 11

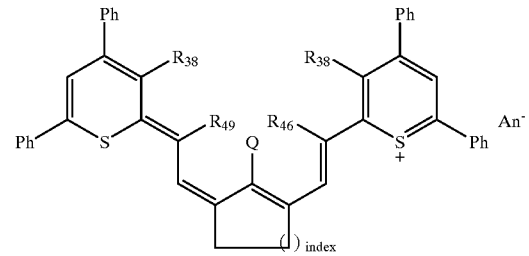

| R38 | R46, R49 | Q | Index | An |
|---|---|---|---|---|
| H | H | PhS— | 2 | Cl |
| EtO2C | H | PhO— | 1 | Cl |
| Ph | H | F20 | 1 | Cl |
| Me | Me | 1-Dodecyl-O— | 1 | ClO4 |
| EtO2C | EtO2C | F2 | 2 | ClO4 |
| —(CH2)2— | | PhS— | 1 | Cl |
| —(CH2)2— | | PhS— | 2 | Cl |
| —(CH2)3— | | F12 | 1 | Cl |
| —(CH2)3— | | MeNH | 2 | Cl |
| F8 | F16 | | 1 | Cl |
| F9 | MeO— | | 2 | C4F9SO3 |

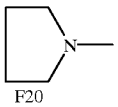

TABLE 12

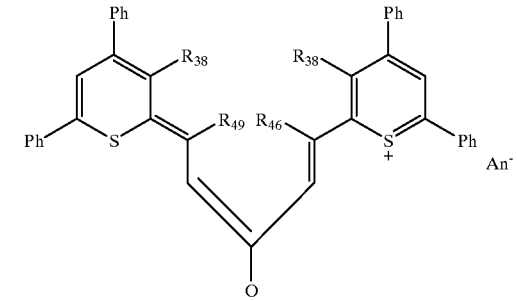

| R38 | R46, R49 | Q | An |
|---|---|---|---|
| H | H | F1 | Cl |
| EtO2C | H | Ph2N— | Cl |
| Ph | H | MeO— | Cl |
| Me | Me | PhO— | ClO4 |
| EtO2C | EtO2C | Et2N— | I |
| —(CH2)3— | PhS | Cl | |
| —(CH2)3— | 1-Bu—S— | Cl | |
| —CHMe—CH2CMe2— | 1-Bu—S— | ClO4 | |
| —(CH2)2— | HOCH2CH2—S— | Cl | |

C) Preparation of the Dyes with M-Groups

Example C1

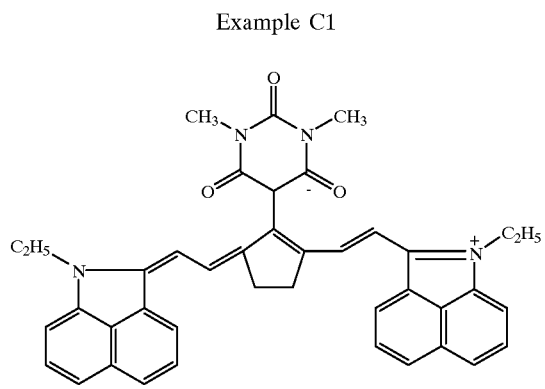

Method 1

A mixture of 10 ml of methanol, 10 ml of methylene chloride, 0.55 g of the dye from example A1, 0.18 g of 1,3-dimethylbarbituric acid and 0.1 g of triethylamine was stirred at room temperature for 3 h. After 1 h were added 10 ml of methylene chloride and 0.1 g of triethylamine. Subsequently the solvent was removed in vacuo, the residue was boiled up with acetone and the precipitate was sucked off while warm. After drying in vacuo at 50° C. 0.40 g of the product of the above-mentioned formula was obtained.

$\lambda_{max}$=1,018 nm (MeOH).

Method 2

A mixture of 0.55 g of the product from example A1, 0.20 g of 1,3-dimethylbarbituric acid, 0.35 g of DABCO, 7 ml of methanol and 30 ml of methylene chloride was stirred overnight at room temperature. Subsequently the product was precipitated with cyclohexane, the precipitate was sucked off, washed with methanol and dried in vacuo at 40° C.

Yield: 0.45 g.

In methods 1 and 2 1,2-dichloroethane or chloroform can be used instead of methylene chloride, as well as methanol can be replaced by ethanol or iso-propanol, without affecting the result.

Method 3

A suspension of 0.55 g of the product from example A1, 0.20 g of 1,3-dimethylbarbituric acid and 0.22 g of DABCO in 30 ml of toluene was stirred at 95 to 100° C. for 1 h. Subsequently the precipitation was sucked off at 70° C., washed with toluene and acetone and dried at 40° C.

Yield: 0.65 g.

The same dye is obtained when 30 ml of chlorobenzene or xylenes instead of toluene is used.

Example C2

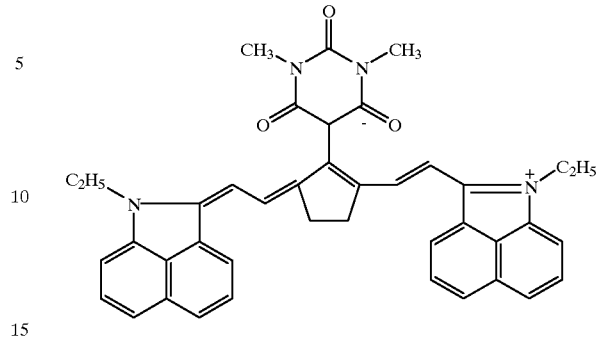

A mixture of 0.56 g of the compound from example A2, 0.20 g of 1,3-dimethylbarbituric acid, 0.1 g of triethylamine, 2 ml of methanol and 30 ml of methylene chloride was stirred at room temperature for 22 h. After 1 h and 4 h 0.1 g of triethylamine was added each time. Subsequently the product was precipitated with cyclohexane.

Yield: 0.5 g.

$\lambda_{max}$=999 nm (CH$_2$Cl$_2$).

Example C3

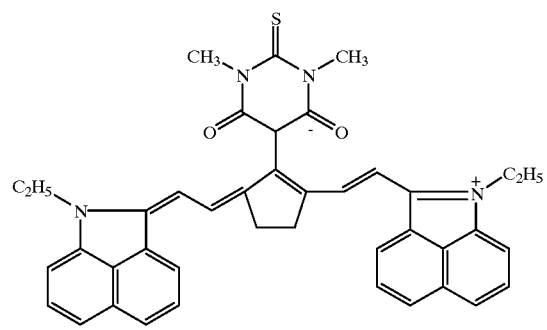

0.55 g of the dye from example A1 and 0.20 g of N,N'-dimethylthiobarbituric acid in a mixture of 30 ml of methylene chloride and 5 ml of methanol were admixed with 0.22 g of DABCO and stirred at room temperature for 4 h.

The precipitate was sucked off and washed with methylene chloride. Yield: 0.2 g. Another 0.4 g of the product of the above-mentioned formula was obtained by mixing the mother-lye with cyclohexane and then sucking off the resulting precipitate.

$\lambda_{max}$=1,030 nm (CH$_2$Cl$_2$).

Example C4

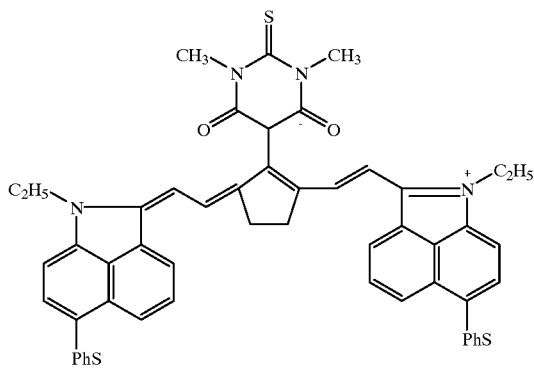

The preparation was done analogously to example C1 from the product prepared in example A4 and 1,3-dimethylbarbituric acid.

$\lambda_{max}$=1,058 nm (CH$_2$Cl$_2$).

Example C5

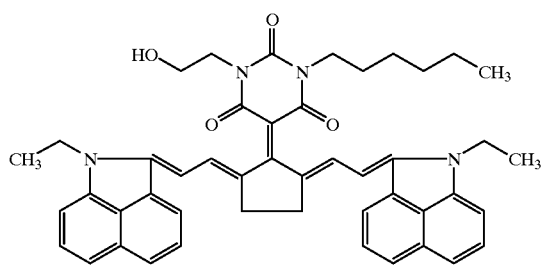

A mixture of 80 ml of ethanol, 10 ml of methylene chloride, 9.3 g of the dye from example A1, 5.4 g of N-hydroxyethyl-N'-hexylbarbituric acid and 1.9 g of DABCO was stirred at room temperature for 6 h. The product was sucked off, washed twice with methanol and dried in vacuo at 50° C.

Yield: 9.2 g.

$\lambda_{max}$=1,022 nm (CH$_2$Cl$_2$).

Example C6

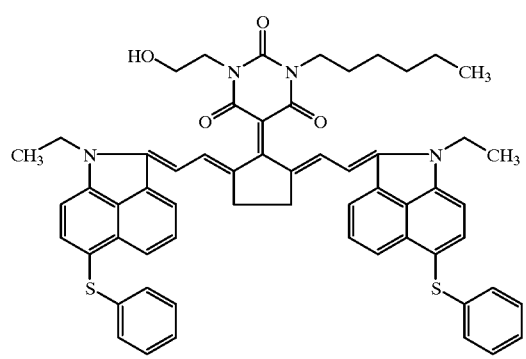

A mixture of 30 ml of methanol, 90 ml of methylene chloride, 15.3 g of the dye from example A4, 8.4 g of N-hydroxyethyl-N'-hexylbarbituric acid and 1.7 ml of pyridine was stirred at room temperature for 5 h. After addition of 100 ml of methanol the mixture was stirred for another 15 min, sucked off and dried.

Yield: 12.6 g.

$\lambda$=1,044 nm (CH$_2$Cl$_2$).

Example C7

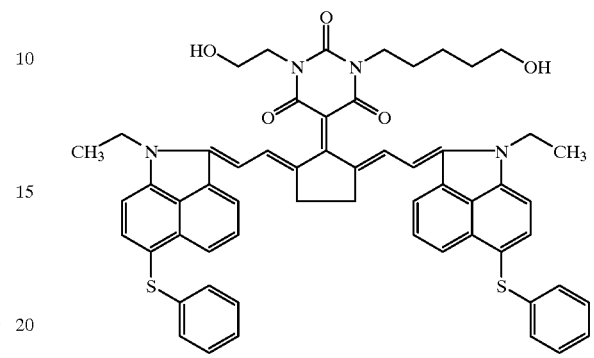

A mixture of 3 ml of methanol, 15 ml of methylene chloride, 1.53 g of the dye from example A4, 0.49 g of N,N'-bishydroxypropylbarbituric acid and 0.16 ml of pyridine was stirred at room temperature for 2 h. Subsequently the solvent was removed in vacuo, the residue was washed with acetone and cyclohexane, and dried.

Yield: 1.2 g.

$\lambda$=1,056 nm (CH$_2$Cl$_2$).

Example C8

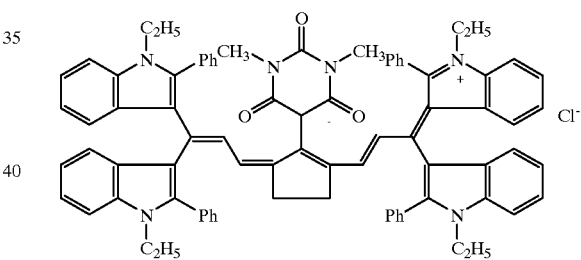

The preparation takes place from the product described in example A5 and 1,3-dimethylbarbituric acid according to the methods described in the examples C1 and C2.

$\lambda_{max}$=926 nm (CH$_2$Cl$_2$), 1,067 nm (CH$_2$Cl$_2$+HCl).

Example C9

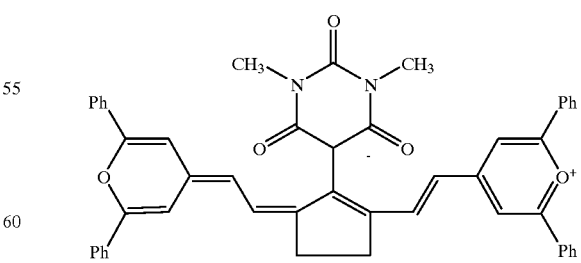

The preparation takes place according to the above-mentioned methods from 1,3-dimethylbarbituric acid and the dye in example A7.

$\lambda_{max}$=955 nm, 1,081 nm (CH$_2$Cl$_2$).

Example C10

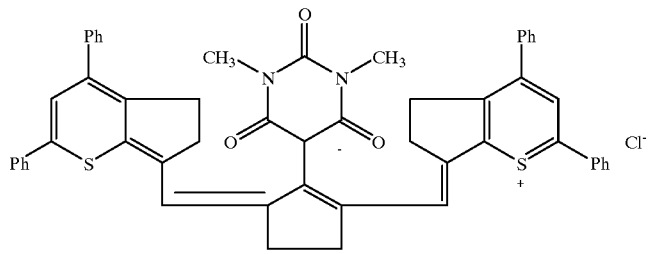

For the preparation of this compound the dye from example A10 was transformed with 1,3-dimethylbarbituric acid according to the above-mentioned methods.

$\lambda_{max}$=1,075 nm, 1,218 nm (CH$_2$Cl$_2$).

Example C11

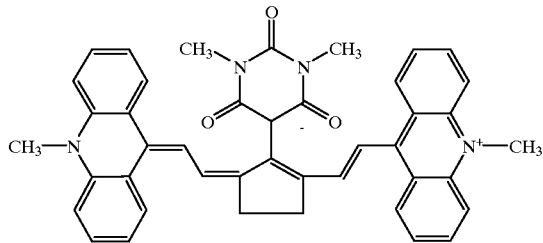

This dye was obtained by transforming 1,3-dimethylbarbituric acid with the dye from example A9 analogously to the preceeding examples C.

$\lambda_{max}$=985 nm.

The following dyes were obtained by transforming the methylene-active compounds (B$_1$CH$_2$B$_2$) from tables 19 to 26 (=B$_1$ —C$^\ominus$ —B$_2$) with the products from example groups A and B analogously to the preceeding examples.

TABLE 13

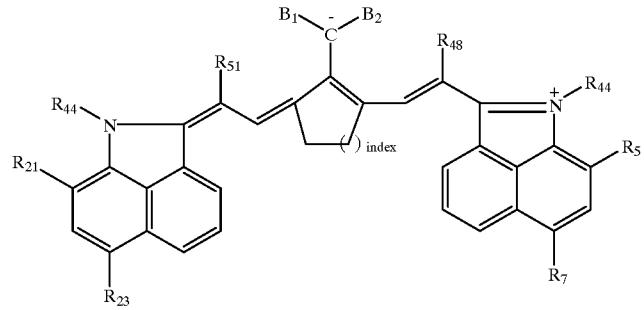

| R$_5$ | R$_7$ | R$_{21}$ | R$_{23}$ | R$_{44}$ | R$_{48}$ | R$_{51}$ | Index | B$_1$—C$^-$—B$_2$ |
|---|---|---|---|---|---|---|---|---|
| H | H | H | H | Me | H | H | 1 | Barb 3 |
| H | H | H | H | Me | H | H | 2 | Barb 1 |
| H | H | H | H | Me | H | H | 1 | Barb 6 |
| H | H | H | H | Me | H | H | 2 | Pz 1 |
| H | PhS | H | PhS | Et | H | H | 1 | Pyr 1 |
| H | PhS | H | PhS | Et | H | H | 1 | Pyr 4 |
| PhS | PhS | PhS | PhS | Et | H | H | 1 | Thia 1 |
| H | Br | H | Br | Et | H | H | 1 | Thia 4 |
| H | Cl | H | Cl | n-Pr | H | H | 2 | Cum 3 |
| H | F1 | H | F1 | Et | H | H | 1 | Barb 5 |
| H | CH$_3$—(CH$_2$)$_3$—S— | H | CH$_3$—(CH$_2$)$_3$—S— | n-Bu | H | H1Pz 2 |
| H | HO—CH$_2$CH$_2$—S— | H | HO—CH$_2$CH$_2$—S— | Et | H | H1Barb 13 |
| H | F2 | H | F2 | 1-Octyl | H | 1 | Barb 15 |
| H | F3 | H | F3 | 1-Dodecyl | H | 1 | Bar 7 |
| H | F4 | H | F4 | 1-Octadecyl | H | H | 1Barb 7 |
| H | Et$_2$N— | H | Et$_2$N— | 1-Hexyl | H | 2 | Barb 2 |
| H | F5 | H | F5 | 1-Pentyl | H | 1 | Pz 3 |
| H | PhO— | H | PhO— | Et | H | 1 | Pyr 5 |

TABLE 13-continued

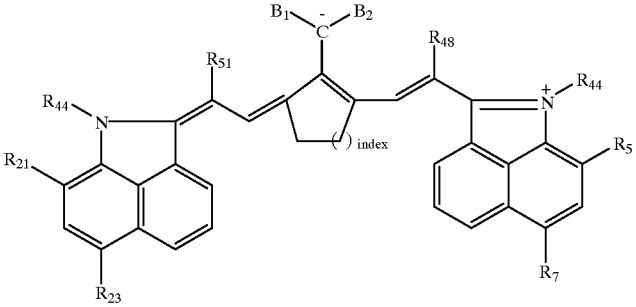

| $R_5$ | $R_7$ | $R_{21}$ | $R_{23}$ | $R_{44}$ | $R_{48}$ | $R_{51}$ | Index | $B_1$—$C^-$—$B_2$ |
|---|---|---|---|---|---|---|---|---|
| H | EtO— | H | EtO— | Et | H | H | 1 | Cum 1 |
| H | PhNH | H | PhNH | 1-Decyl | H | H | 1 | Cum 2 |
| H | n-Bu—NH | H | n-Bu—NH | 1-Hexyl | H | H | 1 | Barb 4 |
| H | HOCH$_2$CH$_2$NH— | H | H | HOCH$_2$CH$_2$NH— | 1-Octyl | H | H1Thia 2 |
| H | H(OCH$_2$CH$_2$)$_2$O— | H | H | H(OCH$_2$CH$_2$)$_2$O— | Et | H | H1Pyr 6 |
| H | PhS— | H | PhS— | HOCH$_2$O— | H | H | 1Barb 1 |
| H | PhS— | H | PhS— | F6 | H | H | 1 | Bar 1 |
| H | F4 | H | F4 | F7 | H | H | 1 | Pz 1 |
| H | Ph—S— | H | PhS— | NC—CH$_2$CH$_2$— | H | H | 1Barb 5 |
| H | HO$_2$CCH$_2$S— | H | H | HO$_2$CCH$_2$S— | Et | H | 1Thia 3 |
| H | Ph—S— | H | PhS— | EtO$_2$CCH$_2$— | H | H | 1 | Barb 4 |
| H | Ph—S— | H | PhS— | PhCH$_2$ | H | H | 1 | Barb 8 |
| H | (HOCH$_2$CH$_2$)$_2$N— | H | H | (HOCH$_2$CH$_2$)$_2$N— | EtO$_2$CCH$_2$CH$_2$— | 1 | HH1Pz 4 |
| H | H | H | H | Et | Me | Me | 1 | Barb 1 |
| H | H | H | H | Me | Et | Et | 2 | Pz 1 |
| H | Ph—S— | H | Ph—S— | Et | 1-Pentyl | 1-Pentyl | 1 | Pyr 4 |
| H | H | H | H | Et | 1-Undecyl | 1-Undecyl | 1 | Cum.6 |
| H | F1 | H | F1 | 1-Tetradecyl | Ph | Ph | 1 | 2Pyr 3 |
| H | NC | H | NC | Et | Me | Me | 1 | Barb 2 |
| H | H$_2$N | H | H$_2$N | Et | H | H | 2 | Barb 2 |
| H | O$_2$N | H | O$_2$N | Et | H | H | 2 | Barb 3 |
| H | HO$_3$S | H | HO$_3$S | Et | H | H | 1 | Barb 1 |

TABLE 14

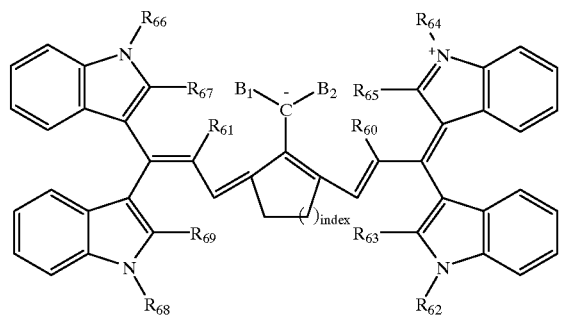

| $R_{62}, R_{64}, R_{66}, R_{68}$ | $R_{63}, R_{65}, R_{67}, R_{69}$ | $R_{60}, R_{61}$ | Index | $B_1$—$C^-$—$B_2$ |
|---|---|---|---|---|
| Me | Ph | H | 1 | Barb 12 |
| Me | Me | H | 2 | Barb3 |
| n-Bu | Ph | H | 1 | Pz 1 |
| 1-Hexyl | Ph | H | 1 | Pz 5 |
| 1-Dodecyl | Ph | H | 1 | Pyr 3 |
| 1-Octadecyl | Ph | H | 1 | Thia 5 |
| HOCH$_2$CH$_2$— | Ph | H | 1 | Cum 4 |
| F6 | Ph | H | 1 | Barb 12 |
| HO—CH$_2$CH$_2$OCH$_2$CH$_2$— | Ph | H | 2 | Barb 10 |
| NCCH$_2$CH$_2$— | Me | H | 2 | Barb 11 |
| EtO$_2$CCH$_2$CH$_2$— | Et | H | 1 | Barb 14 |

TABLE 14-continued

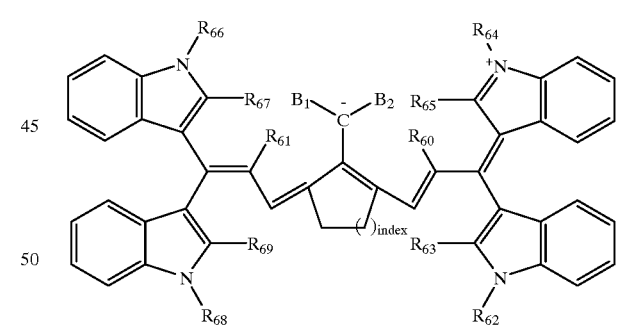

| $R_{62}, R_{64}, R_{66}, R_{68}$ | $R_{63}, R_{65}, R_{67}, R_{69}$ | $R_{60}, R_{61}$ | Index | $B_1$—$C^-$—$B_2$ |
|---|---|---|---|---|
| HO$_2$CCH$_2$— | 1-Butyl | H | 1 | Pz 7 |
| PhCH$_2$ | Ph | H | 1 | Pz 9 |
| Et | Ph | Me | 1 | Thia 6 |
| Et | Ph | Cl | 1 | Pyr 2 |
| Et | Ph | Ph | 1 | Pz 6 |
| Me | Ph | CN | 2 | Cum 5 |
| Et | Ph | 1-Butyl | 1 | Pz 10 |

TABLE 15

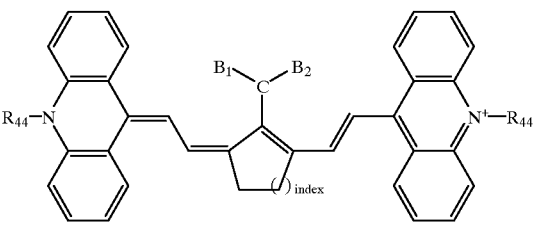

| $R_{44}$ | Index | $B_1$—C$^-$—$B_2$ |
|---|---|---|
| Et | 1 | Barb 3 |
| Et | 2 | Barb 1 |
| 1-Butyl | 1 | Barb 14 |
| 1-Hexyl | 1 | Pz 1 |
| 1-Decyl | 1 | Pz 8 |
| HOCH$_2$CH$_2$— | 1 | Thia 4 |
| H(OCH$_2$CH$_2$)$_2$— | 1 | Pyr 4 |
| F6 | 1 | Pyr 3 |
| PhCH$_2$ | 2 | Thia 3 |
| NCCH$_2$CH$_2$ | 1 | Cum 3 |
| EtO$_2$CCH$_2$ | 1 | Barb 12 |

TABLE 16

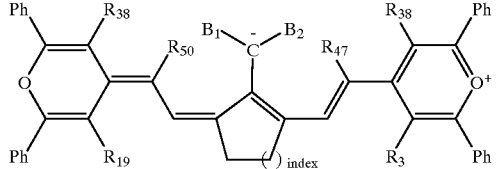

| $R_3$, $R_{19}$, $R_{38}$ | $R_{47}$, $R_{50}$ | Index | $B_1$—C$^-$—$B_2$ |
|---|---|---|---|
| H | H | 1 | Pz 1 |
| H | H | 2 | Thia 1 |
| H | Me | 1 | Pyr 4 |
| H | Et | 1 | Barb 12 |
| Me | H | 1 | Barb 4 |
| Et | Me | 1 | Cum 3 |

TABLE 17

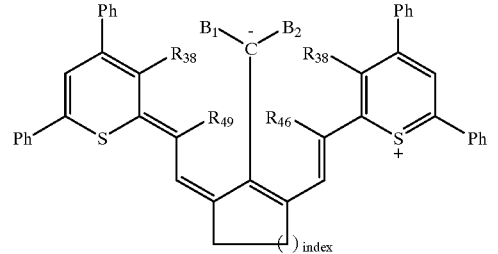

| $R_{38}$ | $R_{46}$, $R_{49}$ | Index | $B_1$—C$^-$—$B_2$ |
|---|---|---|---|
| H | H | 2 | Pz 1 |
| EtO$_2$C | H | 1 | Pz 1 |
| Ph | H | 1 | Thia 3 |
| Me | Me | 1 | Thia 2 |
| EtO$_2$C | EtO$_2$C | 2 | Pyr 4 |
| —(CH$_2$)$_2$— | | 1 | Barb 8 |
| —(CH$_2$)$_2$— | | 2 | Barb 8 |
| —(CH$_2$)$_3$— | | 1 | Barb 13 |

TABLE 17-continued

| $R_{38}$ | $R_{46}$, $R_{49}$ | Index | $B_1$—C$^-$—$B_2$ |
|---|---|---|---|
| —(CH$_2$)$_3$— | | 2 | Barb 13 |
| F8 | | 1 | Cum 3 |
| F9 | | 2 | Pz 5 |

TABLE 18

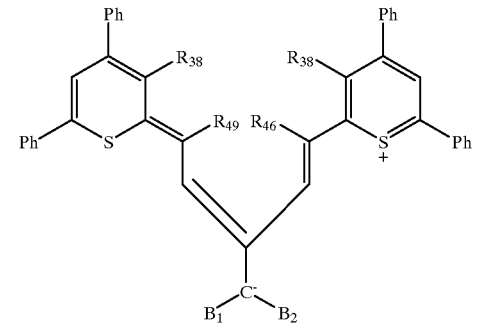

| $R_{38}$ | $R_{46}$, $R_{49}$ | $B_1$—C$^-$—$B_2$ |
|---|---|---|
| H | H | Pz 1 |
| EtO$_2$C | H | Thia 4 |
| Ph | H | Cum 1 |
| Me | Me | Thia 1 |
| EtO$_2$C | EtO$_2$C | Pyr 3 |
| —(CH$_2$)$_3$— | | Barb 1 |
| —(CH$_2$)$_3$— | | Barb 12 |
| —(CHMe—CH$_2$CMe$_2$)— | | Barb 5 |
| —(CH$_2$)$_2$— | | Barb 14 |

TABLE 19

| | $R_{81}$ | $R_{82}$ | $Y_1$ |
|---|---|---|---|
| Barb 1 | Me | Me | O |
| Barb 2 | 1-Bu— | 1-Bu— | O |
| Barb 3 | 1-Hexyl | 1-Hexyl | O |
| Barb 4 | Ph | 1-Dodecyl | O |
| Barb 5 | 1-Hexyl | HOCH$_2$CH$_2$— | O |
| Barb 6 | 1-Octadecyl | HOCH$_2$CH$_2$— | O |
| Barb 7 | HOCH$_2$CH$_2$— | HOCH$_2$CH$_2$— | O |
| Barb 8 | HO(CH$_2$)$_3$— | HO(CH$_2$)$_3$— | O |
| Barb 9 | EtO$_2$CCH$_2$ | EtO$_2$CCH$_2$— | O |
| Barb 10 | 1-Hexyl | HO(CH$_2$)$_3$ | O |

TABLE 19-continued

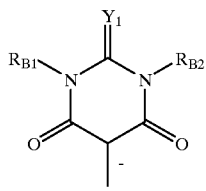

|  | $R_{81}$ | $R_{82}$ | $Y_1$ |
|---|---|---|---|
| Barb 11 | H(OCH$_2$CH$_2$)$_2$— | H(OCH$_2$CH$_2$)$_2$— | O |
| Barb 12 | Mez | Me | S |
| Barb 13 | 1-Hexyl | HOCH$_2$CH$_2$ | S |
| Barb 14 | 1-Octadecyl | HOCH$_2$CH$_2$CH$_2$— | S |
| Barb 15 | Me | Me | NMe |

TABLE 20

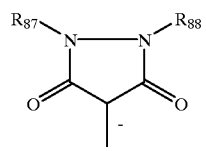

|  | $R_{87}$ | $R_{88}$ |
|---|---|---|
| Pz 1 | Ph | Ph |
| Pz 2 | Me | Me |

TABLE 21

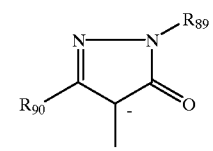

|  | $R_{89}$ | $R_{90}$ |
|---|---|---|
| Pz 4 | Me | Ph |
| Pz 5 | EtO$_2$C | Ph |
| Pz 6 | Ph | Ph |
| Pz 7 | CF$_3$ | Ph |
| Pz 8 | Me |  |
| Pz 9 | Me | —CH$_2$CH$_2$OH |
| Pz 10 | Me | Me |

TABLE 22

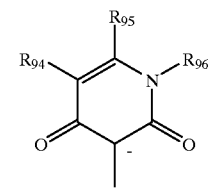

|  | $R_{94}$ | $R_{95}$ | $R_{96}$ |
|---|---|---|---|
| Pyr 1 | H | Ph | 1-Bu |
| Pyr 2 | Et | Ph | Ph |
| Pyr 3 |  | Benzo | 1-Bu |

TABLE 23

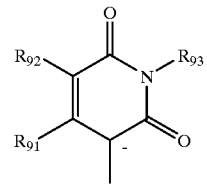

|  | $R_{94}$ | $R_{95}$ | $R_{96}$ |
|---|---|---|---|
| Pyr 4 | Me | CN | Me |
| Pyr 4 | Ph | CN | —CH$_2$CH$_2$OH |
| Pyr 6 | Me | CONH$_2$ | Ph |

TABLE 24

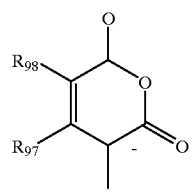

|  | $R_{97}$ | $R_{98}$ |
|---|---|---|
| Cum 1 | Me | CO$_2$Et |
| Cum 2 | Me | Ac |

TABLE 25

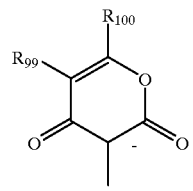

|  | $R_{99}$ | $R_{100}$ |
|---|---|---|
| Cum 3 | Benzo |  |
| Cum 4 | H | Ph |
| Cum 5 | EtO$_2$C | Ph |
| Cum 6 | EtO$_2$C | Me |

TABLE 26

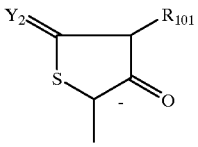

|  | $R_{101}$ | $Y_2$ |
|---|---|---|
| Thia 1 | Me | S |
| Thia 2 | Ph | S |
| Thia 3 | HO$_2$CCH$_2$ | S |
| Thia 4 | HOCH$_2$CH$_2$ | S |
| Thia 5 | Et | O |
| Thia 6 | 1-Bu | NH |

We claim:
1. A compound of the formula (XI)

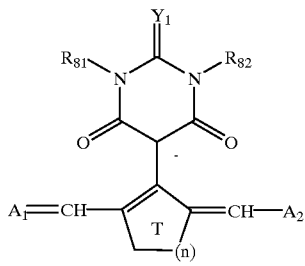

(XI)

wherein
n represents 1 or 2,
ring T is optionally substituted by 1 to 2 $C_1$–$C_4$-alkyl radicals when n=1 and ring T is optionally substituted by 1 to 3 $C_1$–$C_4$-alkyl radicals when n=2,
$R_{81}$ represents Me, 1-Bu-, 1-Hexyl, Ph, 1-Hexyl, 1-Octadecyl, $HOCH_2CH_2$—, $HO(CH_2)_3$—, $EtO_2CCH_2$, 1-Hexyl, $H(OCH_2CH_2)_2$—,
$R_{82}$ represents Me, 1-Bu, 1-Hexyl, 1-Dodecyl, $HOCH_2CH_2$—, $HO(CH_2)_3$—, $EtO_2CCH_2$—, $HO(CH_2)_3$, $H(OCH_2CH_2)_2$—, $HOCH_2CH_2$, $HOCH_2CH_2CH_2$—,
$Y_1$ represents O or S,
$A_1$ and $A_2$ represent:
radicals of formulae (IV)

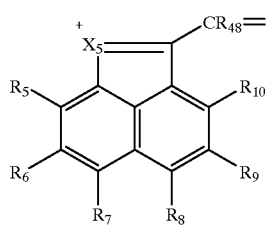

(IV)

and formula (V)

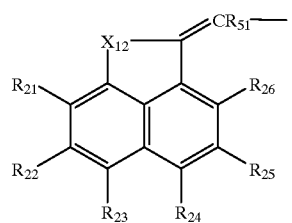

(V)

wherein
$X_5$, $X_{12}$ represent $R_{44}N$; $R_{44}$ represents optionally substituted alkyl, aryl, alkoxy, aryloxy or alkoxycarbonyl;
$R_{48}$, $R_{51}$ represent hydrogen, alkyl, aryl, and alkoxycarbonyl; and
(1) $R_5$, $R_{10}$, $R_{21}$ and $R_{26}$, independently of each other, represent hydrogen, $C_1$–$C_8$-alkyl, amino, mono- and dialkylamino, alkoxy, hydroxy, aryloxy, alkylthio, arylthio and arylamino,
$R_6$, $R_9$, $R_{22}$, and $R_{25}$, independently of each other, represent hydrogen, aryl, halogen, cyano, alkoxycarbonyl, substituted or unsubstituted aminocarbonyl, acyloxy, acylamino, alkylcarbonyl and arylcarbonyl,
$R_7$, $R_8$, $R_{23}$ and $R_{24}$, independently of each other, represent hydrogen, $C_1$–$C_8$-alkyl, amino, mono- and dialkylamino, alkoxy, hydroxy, aryloxy, alkylthio, arylthio and arylamino;
$R_7$, $R_{23}$ further represent

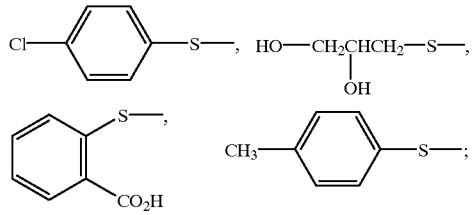

or
(2) $R_5$, $R_{10}$, $R_{21}$ and $R_{26}$, independently of each other, represent hydrogen, aryl, halogen, cyano, alkoxycarbonyl, substituted or unsubstituted aminocarbonyl, acyloxy, acylamino, alkylcarbonyl and arylcarbonyl,
$R_6$, $R_9$, $R_{22}$, and $R_{25}$, independently of each other, represent hydrogen, $C_1$–$C_8$-alkyl, amino, mono- and dialkylamino, alkoxy, hydroxy, aryloxy, alkylthio, arylthio and arylamino,
$R_7$, $R_8$, $R_{23}$ and $R_{24}$, independently of each other, represent hydrogen, aryl, halogen, cyano, alkoxycarbonyl, substituted or unsubstituted aminocarbonyl, acyloxy, acylamino, alkylcarbonyl and arylcarbonyl;
$R_7$, $R_{23}$ further represent

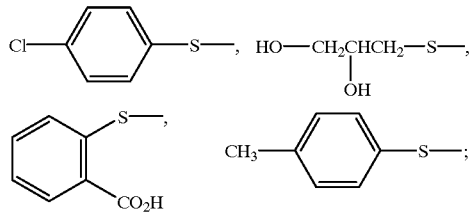

or
(3) $R_5$, $R_6$, $R_7$, $R_8$, $R_9$, $R_{10}$, $R_{21}$, $R_{22}$, $R_{23}$, $R_{24}$, $R_{25}$, $R_{26}$, independently of each other, represent hydrogen and $C_1$–$C_3$-alkyl;
$R_7$, $R_{23}$ further represent

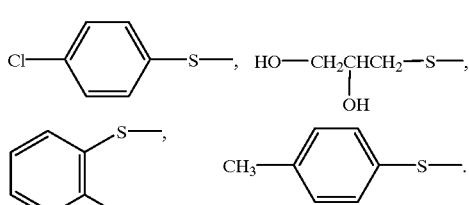

2. A compound according to claim 1 wherein $R_{81}$ represents Me, $R_{82}$ represents Me and $Y_1$ represents O.

3. A compound according to claim 1 wherein $R_{81}$ represents 1-Bu-, $R_{82}$ represents 1-Bu- and $Y_1$ represents O.

4. A compound according to claim 1 wherein $R_{81}$ represents 1-Hexyl, $R_{82}$ represents 1-Hexyl, and $Y_1$ represents O.

5. A compound according to claim 1 wherein $R_{81}$ represents Ph, $R_{82}$ represents 1-Dodecyl, and $Y_1$ represents O.

6. A compound according to claim 1, wherein $R_{81}$ represents 1-Hexyl, $R_{82}$ represents $HOCH_2CH_2$—, and $Y_1$ represents O.

7. A compound according to claim 1, wherein $R_{81}$ represents 1-Octadecyl, $R_{82}$ represents $HOCH_2CH_2$—, and $Y_1$ represents O.

8. A compound according to claim 1, wherein $R_{81}$ represents $HOCH_2CH_2$—, $R_{82}$ represents $HOCH_2CH_2$—, and $Y_1$ represents O.

9. A compound according to claim 1, wherein $R_{81}$ represents $HO(CH_2)_3$—, $R_{82}$ represents $HO(CH_2)_3$—, and $Y_1$ represents O.

10. A compound according to claim 1, wherein $R_{81}$ represents $EtO_2CCH_2$, $R_{82}$ represents $EtO_2CCH_2$—, and $Y_1$ represents O.

11. A compound according to claim 1, wherein $R_{81}$ represents 1-Hexyl, $R_{82}$ represents $HO(CH_2)_3$, and $Y_1$ represents O.

12. A compound according to claim 1, wherein $R_{81}$ represents $H(OCH_2CH_2)_2$—, $R_{82}$ represents $H(OCH_2CH_2)_2$—, and $Y_1$ represents O.

13. A compound according to claim 1, wherein $R_{81}$ represents Me, $R_{82}$ represents Me, and $Y_1$ represents S.

14. A compound according to claim 1, wherein $R_{81}$ represents 1-Hexyl, $R_{82}$ represents $HOCH_2CH_2$, and $Y_1$ represents S.

15. A compound according to claim 1, wherein $R_{81}$ represents 1-Octadecyl, $R_{82}$ represents $HOCH_2CH_2CH_2$—, and $Y_1$ represents S.

16. A compound according to claim 1, wherein n=1; $R_5$, $R_7$, $R_{21}$, $R_{23}$, $R_{48}$ and $R_{51}$ represent H; $R_{44}$ represents Me; $R_{81}$ and $R_{82}$ represent 1-Hexyl; and $Y_1$=O.

17. A compound according to claim 1, wherein; n=2; $R_5$, $R_7$, $R_{21}$, $R_{23}$, $R_{48}$, and $R_{51}$ represent H; $R_{44}$ represents Me; $R_{81}$ and $R_{82}$ represent Me; and $Y_1$=O.

18. A compound according to claim 1, wherein n=1; $R_5$, $R_7$, $R_{21}$, $R_{23}$, $R_{48}$, and $R_{51}$ represent H; $R_{44}$ represents Me; $R_{81}$ represents 1-Octadecyl; $R_{82}$ represents $HOCH_2CH_2$—; and $Y_1$=O.

19. A compound according to claim 1, wherein n=1; $R_5$, $R_{21}$, $R_{48}$, $R_{51}$ represent H; $R_7$ and $R_{23}$ represent $R_{44}$ represents Et; $R_{81}$ represents 1-Hexyl; $R_{82}$ represents $HOCH_2CH_2$—; and $Y_1$=O.

20. A compound according to claim 1, wherein; n=1; $R_5$, $R_{21}$, $R_{48}$, $R_{51}$ represent H; $R_7$ and $R_{23}$ represent HO—$CH_2CH_2$—S—; $R_{44}$ represents Et; $R_{81}$ represents 1-Hexyl; $R_{82}$ represents $HOCH_2CH_2$; and $Y_1$=S.

21. A compound according to claim 1, wherein n=1; $R_5$, $R_{21}$, $R_{48}$, $R_{51}$ represent H; $R_7$ and $R_{23}$ represent

HO—$CH_2CHCH_2$—S—;
         |
         OH $R_{44}$ represents 1-Octyl; $R_{81}$ and $R_{82}$ represents Me; and $Y_1$=Nme.

22. A compound according to claim 1, wherein n=1; $R_5$, $R_{21}$, $R_{48}$, $R_{51}$ represent H; $R_7$ and $R_{23}$ represent $R_{44}$ represents 1-Dodecyl; $R_{81}$ and $R_{82}$ represent $HOCH_2CH_2$—; and $Y_1$=O.

23. A compound according to claim 1, wherein n=1; $R_5$, $R_{21}$, $R_{48}$, $R_{51}$ represent H; $R_7$ and $R_{23}$ represent $R_{44}$ represents 1-Octadecyl; $R_{81}$ and $R_{82}$ represents $HOCH_2CH_2$—; and $Y_1$=O.

24. A compound according to claim 1, wherein n=2; $R_5$, $R_{21}$, $R_{48}$, $R_{51}$ represent H; $R_7$ and $R_{23}$ represent $Et_2N$—; $R_{44}$ represents 1-Hexyl; $R_{81}$ and $R_{82}$ represents 1-Bu—; and $Y_1$=O.

25. A compound according to claim 1, wherein n=1; $R_5$, $R_{21}$, $R_{48}$, $R_{51}$ represent H; $R_7$ and $R_{23}$ represent n-Bu-NH; $R_{44}$ represents 1-Hexyl; $R_{81}$ represents Ph; $R_{82}$ represents 1-Dodecyl; and $Y_1$=O.

26. A compound according to claim 1, wherein n=1; $R_5$, $R_{21}$, $R_{48}$, $R_{51}$ represent H; $R_7$ and $R_{23}$ represent PhS—; $R_{44}$ represents $HOCH_2CH_2O$—; $R_{81}$ and $R_{82}$ represent Me; and $Y_1$=O.

27. A compound according to claim 1, wherein n=1; $R_5$, $R_{21}$, $R_{48}$, $R_{51}$ represent H; $R_7$ and $R_{23}$ represent PhS—; $R_{44}$ represents n-octyl-$CHOHCH_2$—; $R_{81}$ and $R_{82}$ represent Me; and $Y_1$=O.

28. A compound according to claim 1, wherein n=1; $R_5$, $R_{21}$, $R_{48}$, $R_{51}$ represent H; $R_7$ and $R_{23}$ represent PhS—; $R_{44}$ represents NC—$CH_2CH_2$—; $R_{81}$ represents 1-Hexyl; $R_{82}$ represents $HOCH_2CH_2$; and $Y_1$=O.

29. A compound according to claim 1, wherein n=1; $R_5$, $R_{21}$, $R_{48}$, $R_{51}$ represent H; $R_7$ and $R_{23}$ represent PhS—; $R_{44}$ represents $EtO_2CCH_2$—; $R_{81}$ represents Ph; $R_{82}$ represents 1-Dodecyl; and $Y_1$=O.

30. A compound according to claim 1, wherein n=1; $R_5$, $R_{21}$, $R_{48}$, $R_{51}$ represent H; $R_7$ and $R_{23}$ represent Ph—S—; $R_{44}$ represents $PhCH_2$; $R_{81}$ and $R_{82}$ represent $HO(CH_2)_3$—; and $Y_1$=O.

31. A compound according to claim 1, wherein n=1; $R_5$, $R_7$, $R_{21}$, $R_{23}$ represent H; $R_{44}$ represents Et; $R_{48}$, $R_{51}$, $R_{81}$, $R_{82}$ represent Me; and $Y_1$=O.

32. A compound according to claim 1, wherein n=1; $R_5$ and $R_{21}$ represent H; $R_7$ and $R_{23}$ represent NC; $R_{44}$ represents Et; $R_{48}$ and $R_{51}$ represent Me; $R_{81}$ and $R_{82}$ represent 1-Bu-; and $Y_1$=O.

33. A compound according to claim 1, wherein n=2; $R_5$, $R_{21}$, $R_{48}$, $R_{51}$ represent H; $R_7$ and $R_{23}$ represent $H_2N$; $R_{44}$ represents Et; $R_{81}$ and $R_{82}$ represent 1-Bu-; and $Y_1$=O.

34. A compound according to claim 1, wherein n=2; $R_5$, $R_{21}$, $R_{48}$, $R_{51}$ represent H; $R_7$ and $R_{23}$ represent $O_2N$; $R_{44}$ represents Et; $R_{81}$ and $R_{82}$ represent 1-Hexyl; and $Y_1$=O.

35. A compound according to claim 1, wherein n=1; $R_5$, $R_{21}$, $R_{48}$, $R_{51}$ represent H; $R_7$ and $R_{23}$ represent $HO_3S$; $R_{44}$ represents Et; $R_{81}$ and $R_{82}$ represent Me; and $Y_1$=O.

36. A compound according to claim 1 having the formula (XII)

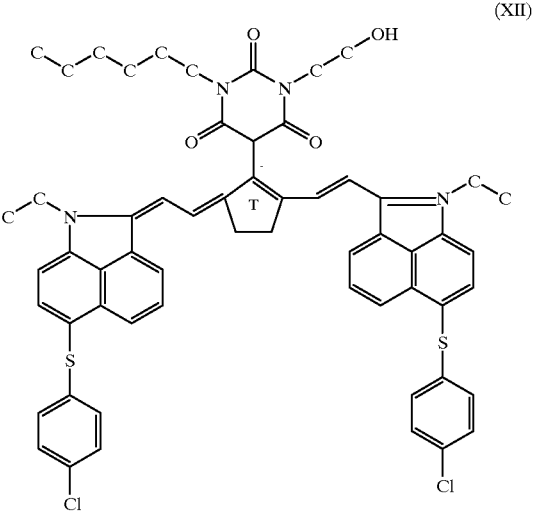

(XII)

wherein ring T can be substituted by 1–2 $C_1$ to $C_4$-alkyl radicals.

* * * * *

UNITED STATES PATENT AND TRADEMARK OFFICE
CERTIFICATE OF CORRECTION

PATENT NO. : 6,008,350  
DATED : December 28, 1999  
INVENTOR(S) : Roschger et al.

Page 1 of 1

It is certified that error appears in the above-identified patent and that said Letters Patent is hereby corrected as shown below:

Column 29,
Table 1-continued: continuation of Table 1 should be deleted;

Column 32,
Line 44, "a" shoud read -- of --;
Line 48, "ml" should read -- 12 ml --;
Line 62, "ecipitate" should read -- precipitate --;
Line 63, "2:1" should read -- 2:1¶Yield: 1.0 g --;
Line 64, "Yield: 1.0 g" should be deleted;

Column 33,
Example B2, in the formula, "S¯$(CH_2)_3CH_3$ " should read -- S–$(CH_2)_3CH_3$ --;
Line 15, "root" should read -- room --.

Column 34,
Line 13, "ml" should read -- 20 ml --;

Column 37,
Table 7-continued, continuation of Table 7 should be deleted;
Table 8, column Q, "Phol" should read -- PhOI --.

Column 50,
Table 19, in the formula "$R_{B1}$" should read -- $R_{81}$ --; and "$R_{B2}$" should read -- $R_{82}$ --.

Column 51,
Table 19-continued, In the formula "$R_{B1}$" should read -- $R_{81}$ --; and "$R_{B2}$" should read -- $R_{82}$.

Signed and Sealed this

Ninth Day of October, 2001

*Attest:*

NICHOLAS P. GODICI  
*Attesting Officer*     *Acting Director of the United States Patent and Trademark Office*